(12) United States Patent
Churchill

(10) Patent No.: US 11,773,736 B2
(45) Date of Patent: Oct. 3, 2023

(54) SEGMENTED AUGMENTED TURBINE ASSEMBLY

(71) Applicant: ORGANOWORLD INC., Brossard (CA)

(72) Inventor: Frederick Churchill, Brossard (CA)

(73) Assignee: ORGANOWORLD INC., Etobicoke (CA)

( * ) Notice: Subject to any disclaimer, the term of this patent is extended or adjusted under 35 U.S.C. 154(b) by 0 days.

(21) Appl. No.: 17/755,426

(22) PCT Filed: Oct. 29, 2019

(86) PCT No.: PCT/CA2019/051522
§ 371 (c)(1),
(2) Date: Apr. 28, 2022

(87) PCT Pub. No.: WO2021/081616
PCT Pub. Date: May 6, 2021

(65) Prior Publication Data
US 2022/0389824 A1 Dec. 8, 2022

(51) Int. Cl.
*F01D 9/04* (2006.01)
*F02C 7/055* (2006.01)
*F01D 25/12* (2006.01)

(52) U.S. Cl.
CPC .............. *F01D 9/041* (2013.01); *F01D 25/12* (2013.01); *F02C 7/055* (2013.01); *F05D 2220/323* (2013.01); *F05D 2220/80* (2013.01); *F05D 2240/11* (2013.01); *F05D 2240/128* (2013.01); *F05D 2250/323* (2013.01); *F05D 2250/511* (2013.01); *F05D 2260/607* (2013.01)

(58) Field of Classification Search
CPC .......... F01D 9/041; F01D 25/12; F02C 7/055; F02C 1/10; F05D 2220/323; F05D 2220/80; F05D 2240/11; F05D 2240/128; F05D 2250/323; F05D 2250/511; F05D 2260/607; F03B 17/005; F03B 3/04; F03B 11/00; F05B 2240/133; F02K 3/00
See application file for complete search history.

(56) References Cited

U.S. PATENT DOCUMENTS

| | | | |
|---|---|---|---|
| 4,345,160 A * | 8/1982 | Smith | F03B 17/005 416/197 B |
| 7,111,449 B1 * | 9/2006 | Stebbings | F02K 7/12 60/269 |
| 7,395,657 B2 * | 7/2008 | Johnson | B64D 33/02 60/226.3 |

(Continued)

*Primary Examiner* — Brian Christopher Delrue
(74) *Attorney, Agent, or Firm* — Lavery, de Billy, L.L.P.; Gonzalo Lavin

(57) ABSTRACT

A segmented augmented turbine assembly for generating electricity from a fluid in motion, the assembly comprising a segmented annular ducted channel extending between an inlet receiving the fluid and an outlet, the channel comprising a convergent accelerating the fluid, a segmented turbine-rotor section comprising blades and guide vanes rotating about a central shaft coupled to a generator, and a diffuser section configured to decelerate the fluid, wherein the channel comprises solid inserts attached to an outside face of the turbine-rotor section, the flow stream passing through open flow-through segments positioned between the solid inserts.

19 Claims, 16 Drawing Sheets

(56) References Cited

U.S. PATENT DOCUMENTS

| | | | | |
|---|---|---|---|---|
| 9,752,549 | B2* | 9/2017 | Roberts | F03B 13/08 |
| 9,764,848 | B1* | 9/2017 | Vondrell | F01D 15/10 |
| 2002/0122717 | A1* | 9/2002 | Ghetzler | F01D 25/12 |
| | | | | 415/35 |
| 2010/0251692 | A1* | 10/2010 | Kinde, Sr. | F02K 7/16 |
| | | | | 60/767 |
| 2012/0003077 | A1* | 1/2012 | Churchill | F03D 80/00 |
| | | | | 415/220 |
| 2016/0079829 | A1* | 3/2016 | Vera | F03D 9/25 |
| | | | | 415/220 |
| 2019/0338664 | A1* | 11/2019 | Kozhevnikov | F01D 15/10 |
| 2021/0102492 | A1* | 4/2021 | Rambo | F02C 3/22 |
| 2021/0348590 | A1* | 11/2021 | Churchill | F03D 9/25 |

* cited by examiner

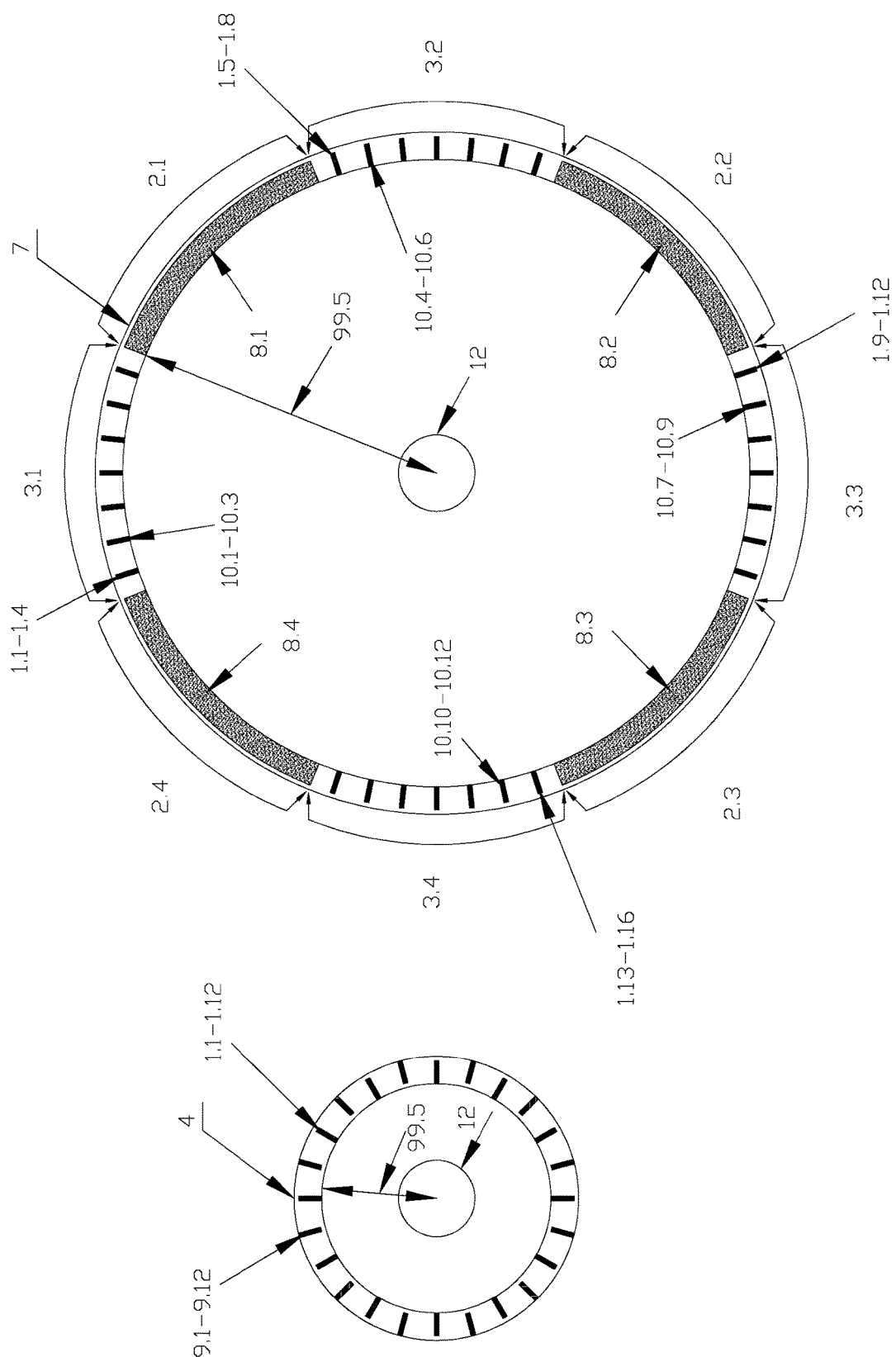

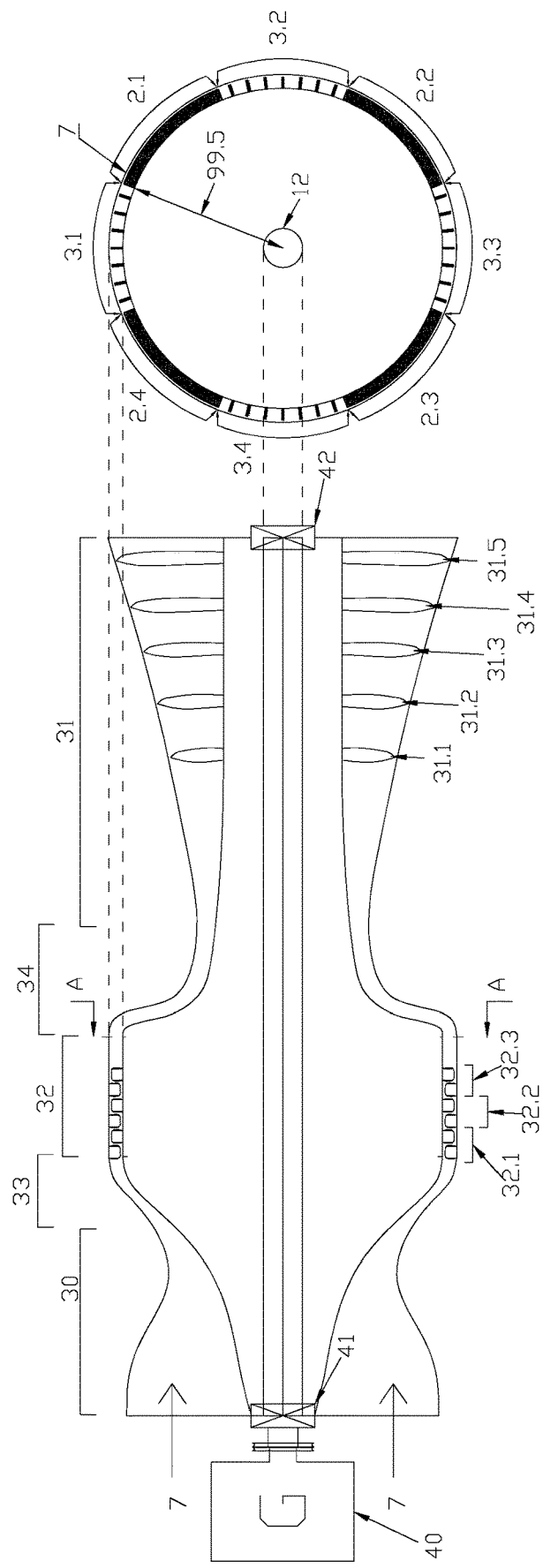

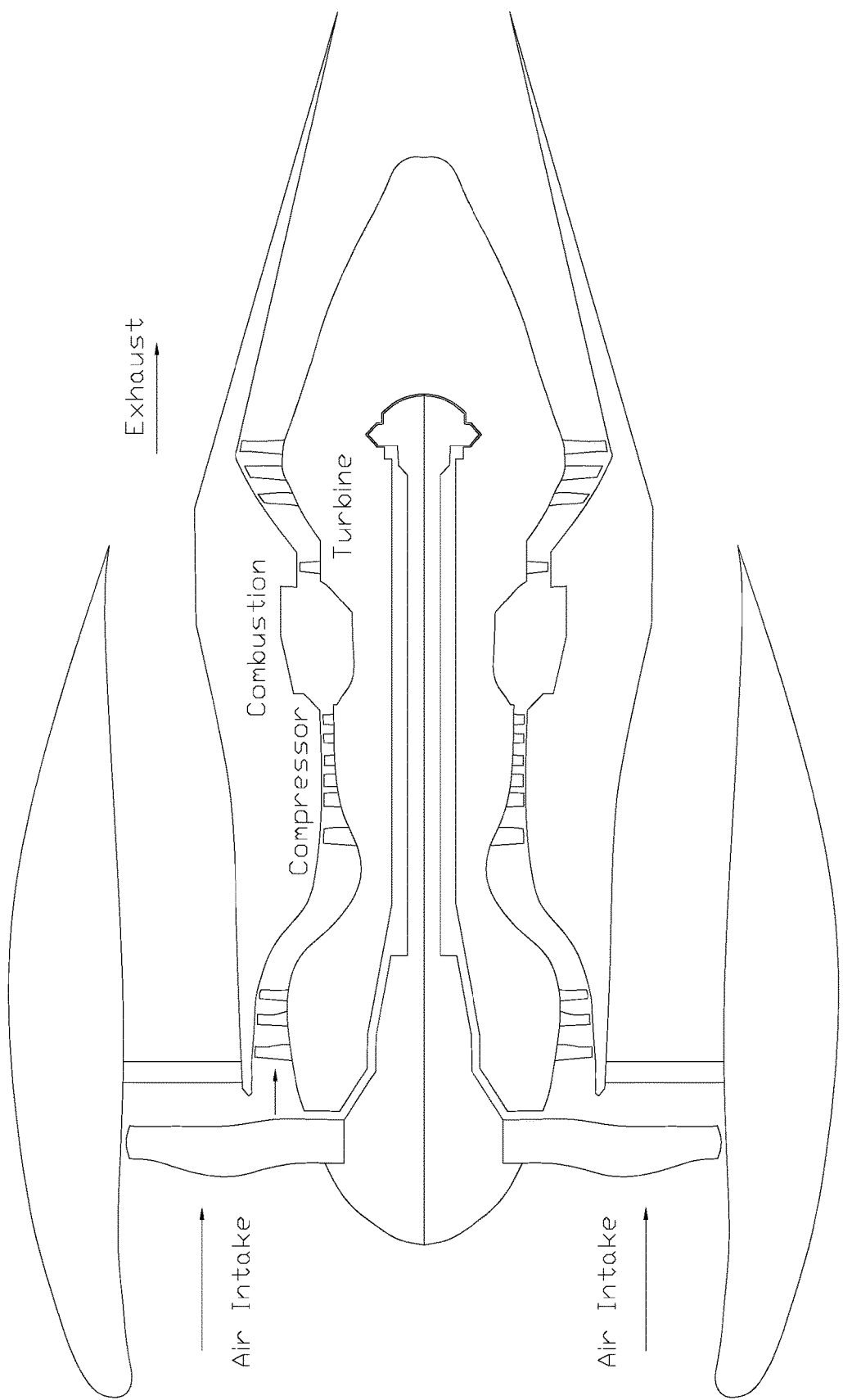

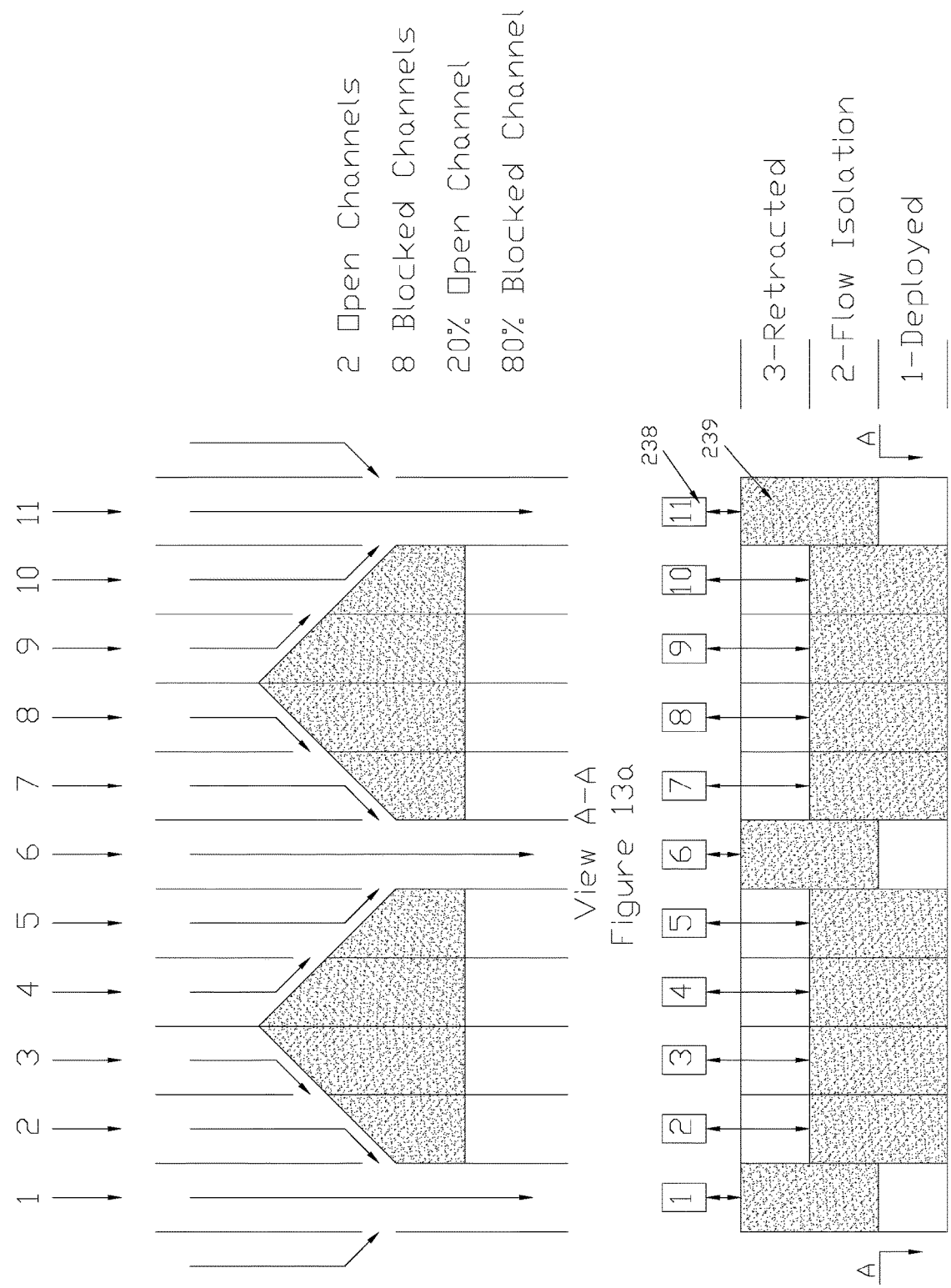

View B-B

View A-A

SEGMENTED AUGMENTED TURBINE ASSEMBLY

CROSS-REFERENCE TO RELATED APPLICATION

This application is a National Entry Application of PCT application No. PCT/CA2019/051522 filed on Oct. 29, 2019 and published in English under PCT Article 21(2). The document above is incorporated herein in its entirety by reference.

FIELD OF THE INVENTION

The present invention relates to a fluid turbine assembly for producing electricity or for producing and concentrating power for driving applications. Specifically, the present invention relates to a segmented augmented turbine assembly for generating electricity from a fluid in motion, as well as a system for providing thrust to an aircraft.

BACKGROUND OF THE INVENTION

In legacy steam turbines, increasing the moment applied to the shaft is rarely obtained by maximizing the energy-density of the flow stream within the turbine itself and invariably requires increasing the energy content of the flow stream prior to the turbine inlet by burning more fuel to increase its pressure and temperature.

In the case of water turbines, it is invariably an increase in the hydraulic head of the flow stream prior to the turbine that subsequently increases both the flow stream energy-density and its velocity through the turbine-rotor. Cavitation may be a limiting factor in high-head hydraulic applications.

Legacy fluid turbines were simply not designed to maximize internally the flow parameters of energy-density, flow velocity and the radius of the rotors. A maximum moment, not a maximized moment is applied to the turbine-rotor shaft. In legacy turbines, proportionally more fuel energy or head energy is required upstream of the inlet to produce a larger moment at the turbine-rotor shaft.

Most often, the flow stream cross-sectional area progressively expands rather than contracts once it enters a legacy axial flow turbine, and the entry is normally through a relatively small, high-velocity, nozzle-type connection.

Many conceive that the 'work done' by a turbine-assembly is solely related to the energy content of the inlet flow stream and that the actual 'work done' by the turbine-assembly (energy in Joules) cannot exceed inlet flow stream energy (energy in Joules). As both energy and 'work done' are measured in Joules, one Joule of 'work done' equals one Joule of energy.

'Work done' is converted to energy and is the basis for the law of conservation of energy. 'Work done' thus answers the question: where does energy come from?

This has created an energy production paradigm that ignores the fact that it is the 'work done' and not the conversion of the input fluid energy that controls the amount of energy produced by a turbine. The amount of the 'work done' is the product of the amount of inlet energy of the flow stream, plus the potential benefits of the application of laws of physics built into the turbine-assembly operations to produce additional 'work done', plus the efficiency of the process units within the turbine-assembly.

SUMMARY OF THE INVENTION

The object of the present disclosure is to provide a fluid turbine.

In order to address the above drawbacks, there is provided a segmented augmented turbine assembly for generating electricity from a fluid in motion, the segmented augmented turbine assembly comprising a segmented annular ducted channel extending between an inlet for receiving a flow stream of the fluid and an outlet for expelling the fluid, the segmented annular ducted channel comprising a convergent section configured to accelerate the fluid received at the inlet, a segmented turbine-rotor section comprising a plurality of blades rotating about a central shaft operatively coupled to a generator for generating electricity, and a diffuser section configured to decelerate the fluid before the fluid exits at the outlet, wherein the segmented augmented turbine assembly further comprises a recycling unit comprising a propulsor for propulsing the flow stream from the outlet to the inlet via a plurality of piping, wherein the segmented annular ducted channel comprises a plurality of solid inserts attached to an outside face of the segmented turbine-rotor section, the flow stream passing through a plurality of open flow-through segments positioned between the solid inserts, and wherein the plurality of solid inserts divides the channel into a plurality of sealed segments and a plurality of open flow-through segments.

There is also provided a system for providing thrust to an aircraft, the system comprising a power section comprising a annular ducted channel receiving a first air flow stream and expelling the first air flow stream in a first exhaust stream, the annular ducted channel comprising a convergent section configured to accelerate the first air flow stream received at a power inlet, a turbine-rotor section comprising a turbine rotor and a plurality of blades, and a diffuser section configured to decelerate the first air flow stream before the fluid exits at a power outlet, and a thruster section receiving a second air flow stream through a thruster convergent section and expelling the second air flow stream in a second exhaust stream at a thruster divergent section, the thruster section comprising an inlet propulsor leading to a large diameter ducted channel, the thruster convergent section comprising a plurality of compression stages, and a diverging nozzle assembly, and wherein the first exhaust stream and the second exhaust stream are mixed as they are discharged to provide thrust to the aircraft.

There is also provided a segmented augmented independent channel turbine assembly for generating electricity from a fluid stream in motion, the segmented augmented turbine assembly comprising at least one independent flow channel comprising a plurality of sidewalls extending between an inlet for receiving the fluid stream and an outlet for expelling the fluid stream, the at least one independent flow channel comprising a convergent section being fed the fluid stream by an inlet transfer line, the convergent section configured to accelerate the fluid stream, a turbine-rotor section comprising a plurality of stages of blades attached to the sidewalls of the at least one independent flow channel, the blades rotatable about a central shaft operably coupled to a generator for generating electricity, the fluid stream rotating the blades as it passes through the turbine-rotor section, and a diffuser section expelling the fluid stream through an outlet transfer line, the diffuser section configured to decelerate the fluid stream before it exits at the outlet, and a propulsor for recirculating the fluid stream through the at least one independent flow channel via recirculation piping, the propulsor receiving the fluid stream from the outlet transfer line and propulsing the fluid stream to the inlet transfer line.

There is also provided a power system for generating and storing electrical energy to provide thrust to an aircraft, the system comprising a power section comprising an annular ducted channel receiving an air flow stream and expelling the air flow stream in an exhaust stream, the annular ducted channel comprising a convergent section configured to accelerate the air flow stream received at a power inlet, a turbine-rotor section comprising a turbine rotor and a plurality of blades, and a diffuser section configured to decelerate the air flow stream before the fluid exits at a power outlet, wherein the power section is mounted in a circular power assembly comprising a cylinder, the cylinder comprising the power section and a central shaft driven by the power section to generate electricity, the cylinder installed on the aircraft such that air enters the end of the cylinder facing forward and discharges at the opposite end of the cylinder, and wherein the exhaust stream is discharged to provide thrust to the aircraft.

There is also provided a system for providing thrust to an aircraft, the system comprising a thruster section receiving an air flow stream through a thruster convergent section and expelling the air flow stream in an exhaust stream at a thruster divergent section, the thruster section comprising an inlet propulsor leading to a large diameter ducted channel, the thruster convergent section comprising a plurality of compression stages, and a diverging nozzle assembly, wherein the thruster section is mounted in a circular thruster assembly comprising a cylinder, the cylinder comprising the thruster section and installed on the aircraft such that air enters the end of the cylinder facing forward and discharges at the opposite end of the cylinder, and wherein the exhaust stream is discharged to provide thrust to the aircraft.

BRIEF DESCRIPTION OF THE DRAWINGS

FIG. 2A is a schematic drawing of an existing small diameter annular turbine and flow channel, and FIG. 2B is a schematic drawing of a larger diameter segmented channel and rotor in accordance with an illustrative embodiment of the present invention;

FIGS. 7A and 7B are a schematic drawing and a cut schematic drawing, respectively, of an annular converging-diverging nozzle and extended throat with a segmented annular flow channel and turbine rotors, in accordance with an illustrative embodiment of the present invention;

FIG. 11 is a schematic drawing of an existing example of a high bypass jet engine used to power commercial jets;

FIGS. 13A and 13B are schematic drawings of a partition control mechanism for a system for providing thrust to an aircraft, in accordance with an illustrative embodiment of the present invention;

DETAILED DESCRIPTION OF THE ILLUSTRATIVE EMBODIMENTS

The present disclosure teaches a SAMWAT, which is an acronym for Segmented, Augmented, Maximum Work, Annular Turbine. The application of the SAMWAT technology to produce electricity is identified as a SAMWAT-E/Generator or SAMWAT-E/G, whereas the application of the SAMWAT technology to produce thrust is called the SAMWAT-Thruster or SAMWAT-T.

Figure 1A:
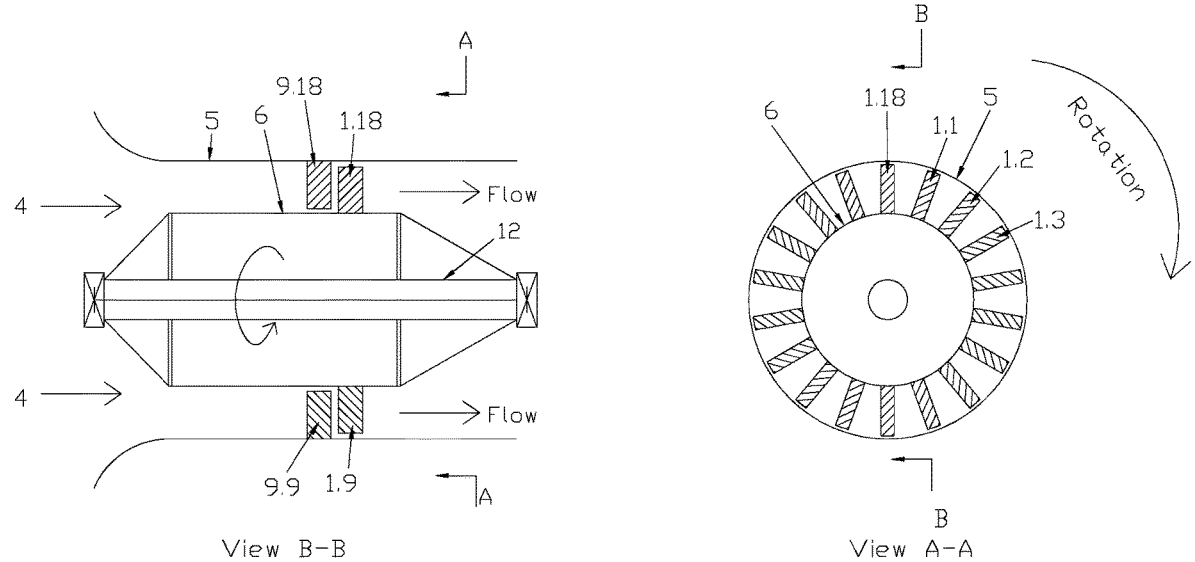
FIG. 1A is a schematic drawing of an example of an existing turbine rotor design with a non-segmented channel.
Figure 1B:
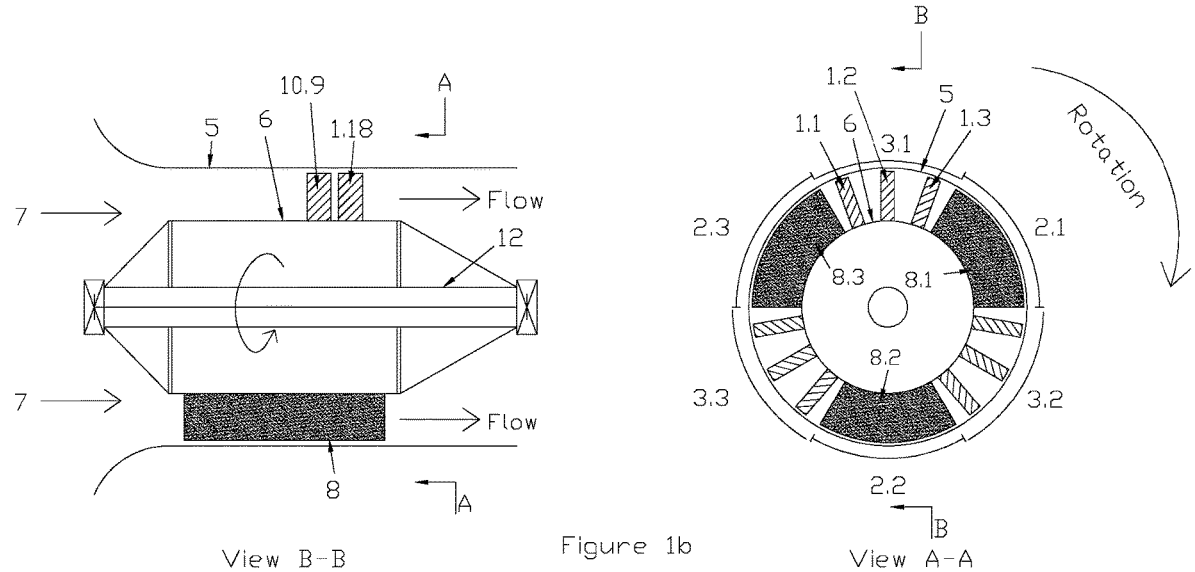
FIG. 1B is a schematic drawing of the same turbine rotor design as FIG. 1A with added inserts to create a segmented flow channel in accordance with an illustrative embodiment of the present invention.

FIGS. 1A and 1B are schematic drawings showing the basic difference between a legacy non-segmented flow channel and its rotor and a segmented SAMWAT flow channel and its rotor. FIG. 1A illustrates a legacy rotor and FIG. 1B shows that inserts have been added to the same rotor to be able to change its open area. There is no longer one continuous circular flow channel. Within the flow channel, there are now segments operating as open, flow-through segments and there are sealed segments (no flow).

FIG. 2A illustrates a legacy small diameter rotor and flow channel, wherein 100% of its open area is used for fluid flow. FIG. 2B shows a much larger diameter segmented channel and rotor with the same open area but with equal quantities of two different types of segments: flow-through segments (3.1-3.4) and sealed segments (2.1-2.4).

Figure 3:
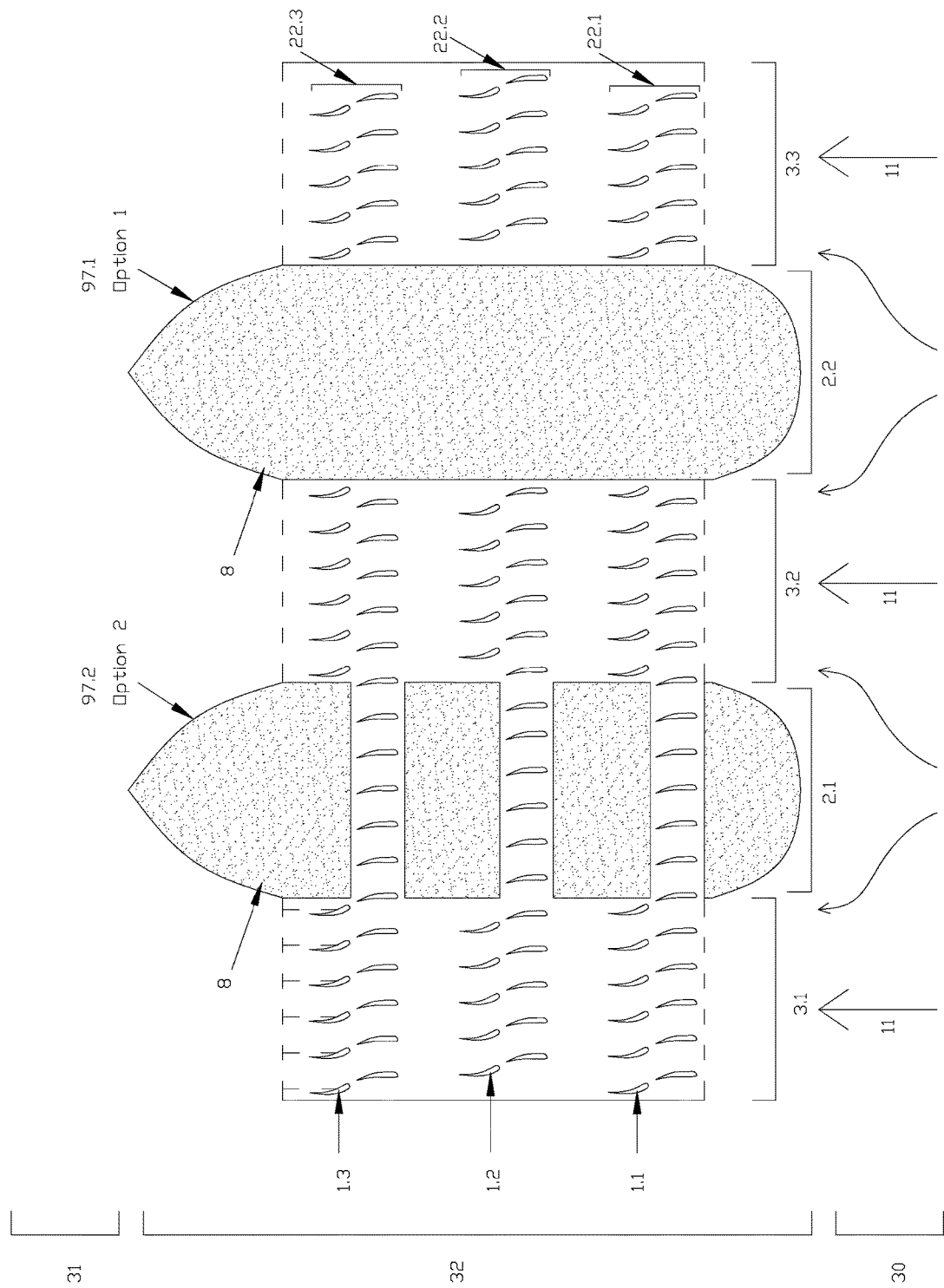
FIG. 3 is a schematic drawing of adjacent inserts creating independent flow-through segments in a flow channel, in accordance with an illustrative embodiment of the present invention.

FIG. 3 is a schematic drawing showing how adjacent inserts attached to the outer face of the inner wall of the flow channel can create independent flow-through segments within the existing flow channel. Items 3.1-3.4 represent open, flow-through segments and items 2.1-2.4 represent sealed segments. Option 1 is applicable if the guide-vanes are rotating with the blades, and option 2 is applicable if the guide vanes are fixed and attached to the stator wall (96).

Figure 4:
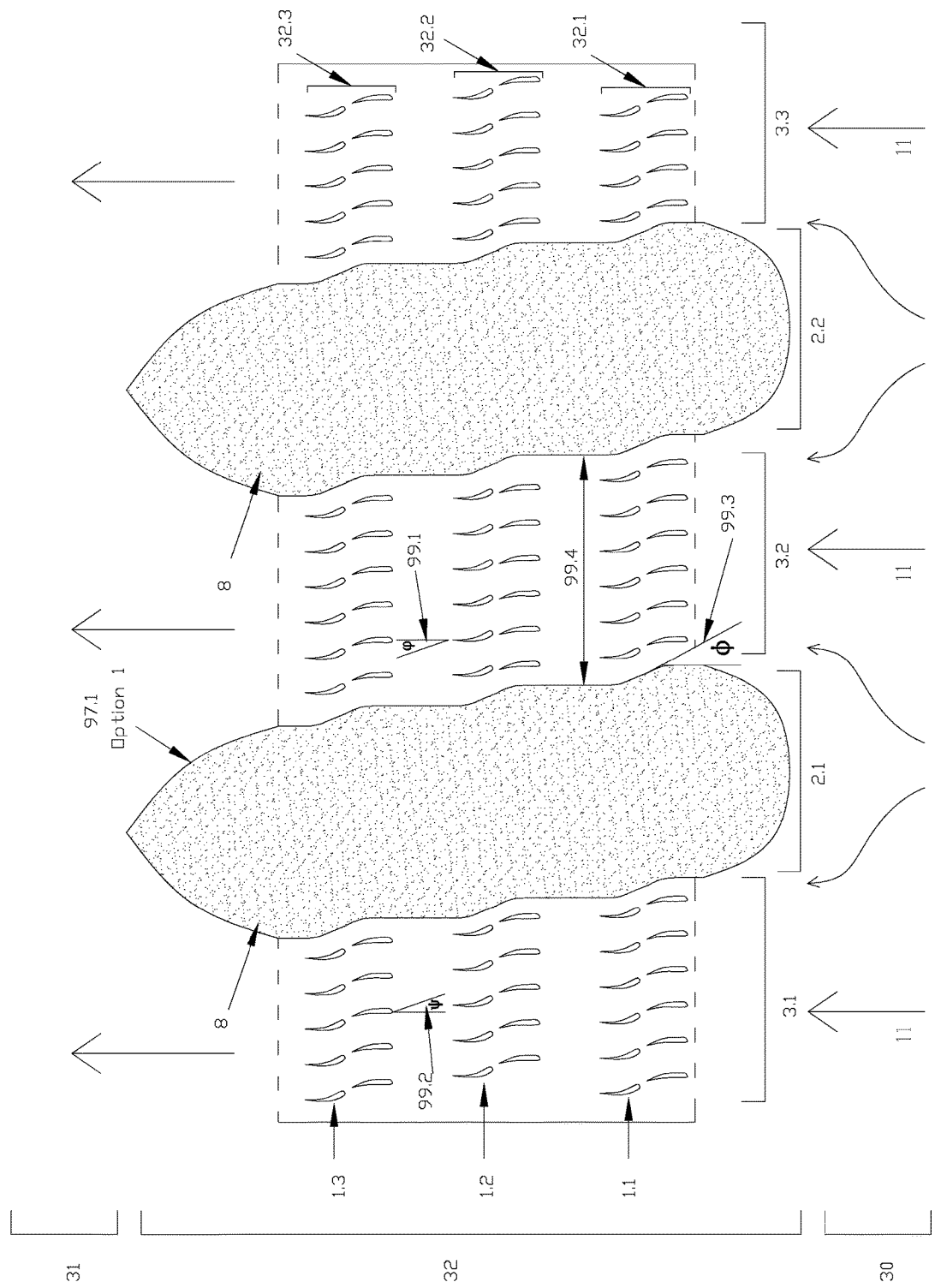
FIG. 4 is another schematic drawing of adjacent inserts creating independent flow-through segments in a flow channel, in accordance with an illustrative embodiment of the present invention.

FIG. 4 is a schematic drawing that illustrates how the distance between the faces of adjacent inserts can be adjusted to control the flow stream velocity in the channel they have created. It also shows how the angle of the face of the insert relative to axial flow can be used to change the angle of flow of the flow stream relative to axial direction.

As the blades (1) of the turbine-rotor are rotating, the fluid stream will travel axially over the faces of the blades (1) like the flow of air over an airplane wing.

Figure 5:
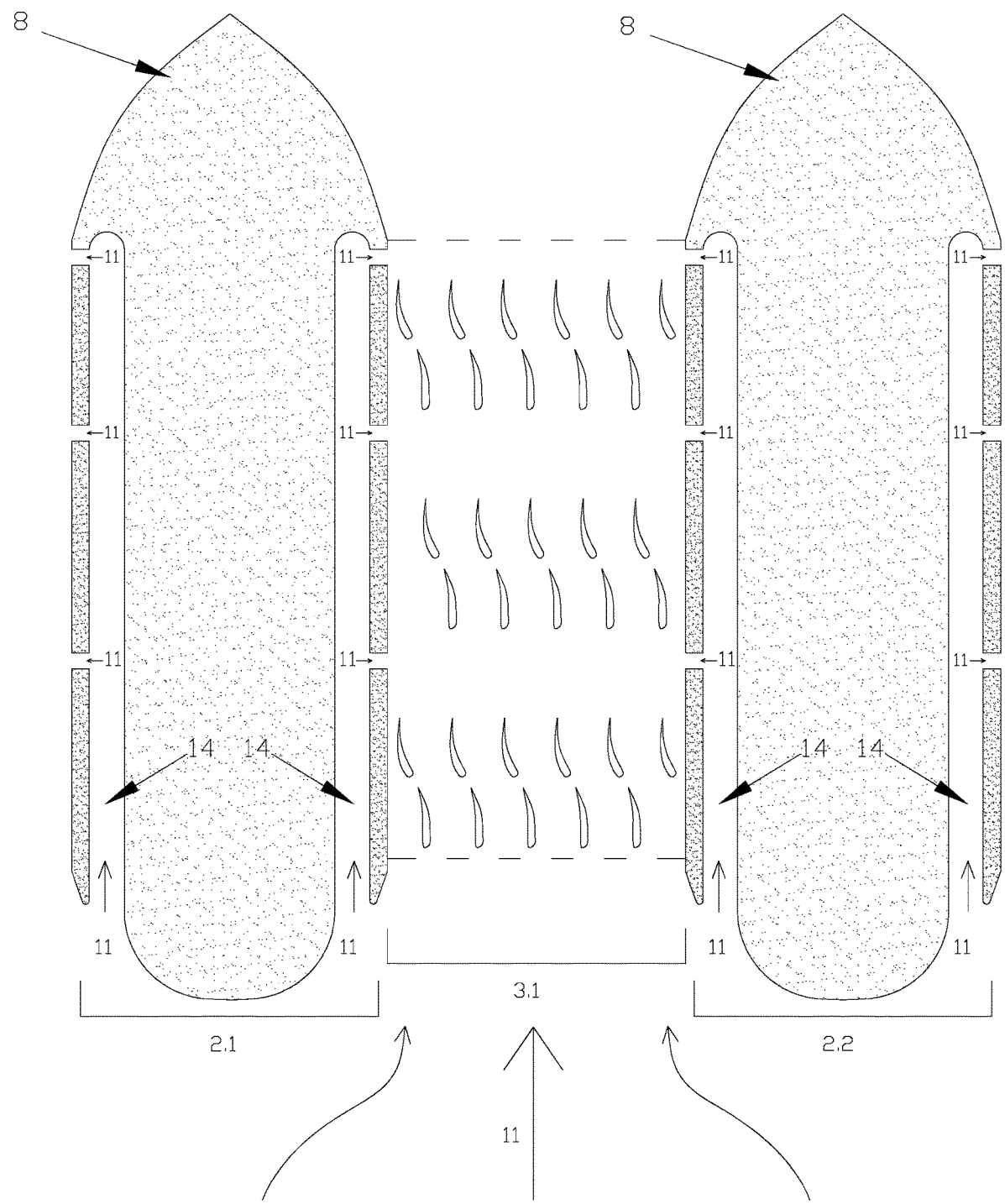
FIG. 5 is a schematic drawing of a flow channel with cuts in the solid inserts, in accordance with an illustrative embodiment of the present invention.

FIG. 5 is a schematic drawing showing how channels (14) cut in the solid inserts (8) can be used to regenerate the level of energy (static pressure) in the flow stream by connecting the downstream flow channel after the rotor stages with the lower pressure of the upstream convergent discharge channel. The channels identified by 11 do not extend from top to bottom of the insert and are cut in the thickness of the insert adjacent to the face of the rotor. Part of the face of the rotor can be used to increase the volume of the channel.

Figures 6A, 6B:
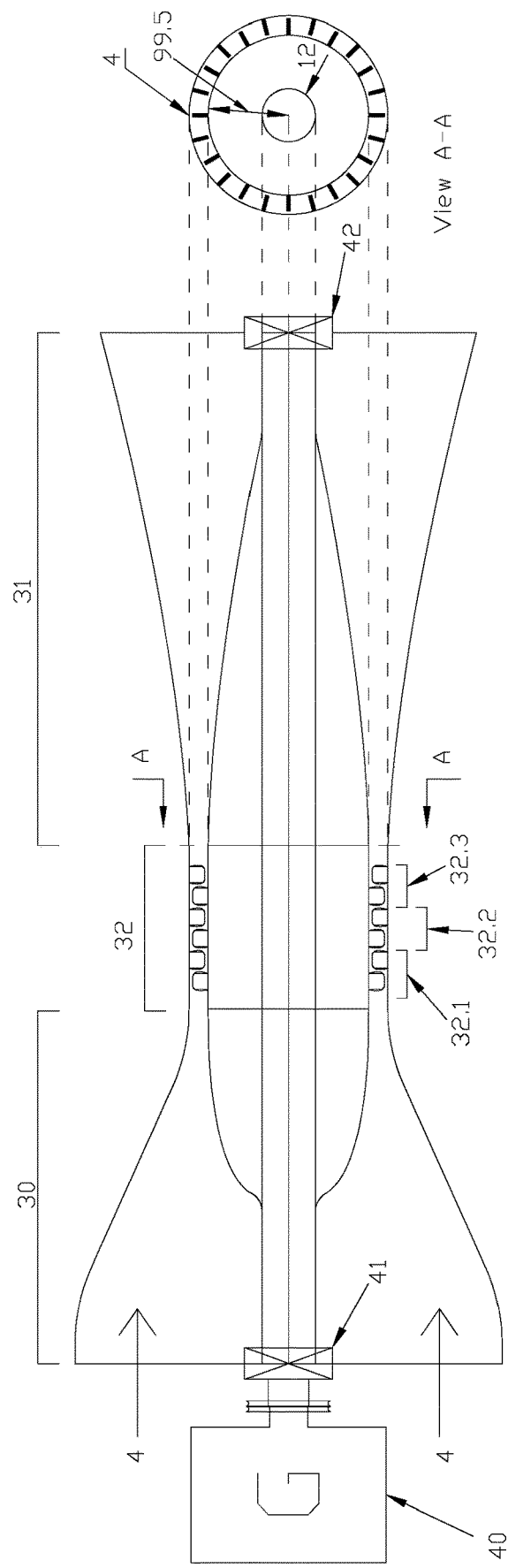
FIGS. 6A and 6B are a schematic drawing and a cut schematic drawing, respectively, of an existing converging-diverging nozzle and extended throat with non-segmented annular flow channels and turbine rotors.

FIGS. 6A and 6B are schematic drawings showing a legacy C-D nozzle and extended throat with non-segmented annular flow channels and turbine-rotors. In this example the radius of the convergent section, diffuser section and throat section are basically the same. The throat has not been lengthened and does not extend outwards away from the center line of the rotating shaft.

FIGS. 7A and 7B are schematic drawings showing an annular C-D nozzle and extended throat with segmented annular flow channel and turbine-rotors. The outward extension of the throat has necessitated the addition of two transfer sections to the standard C-D nozzle configuration (33 and 34). This outward extension is optional and depends on the application. The radius of the segmented turbine-rotor is several times that of the non-segmented turbine-rotor of FIG. 6, even though both turbines have the same flow area. In order to operate the segmented turbine at much higher flow stream velocities, multiple power extraction turbine-rotors (31.1-31.5) are inserted into the diffuser flow stream to avoid jet-flow conditions at the diffuser inlet. The torque generated by the turbine rotor blades and the diffuser rotor blades are transmitted to the common shaft (12) by the support arms (17).

Figure 8:
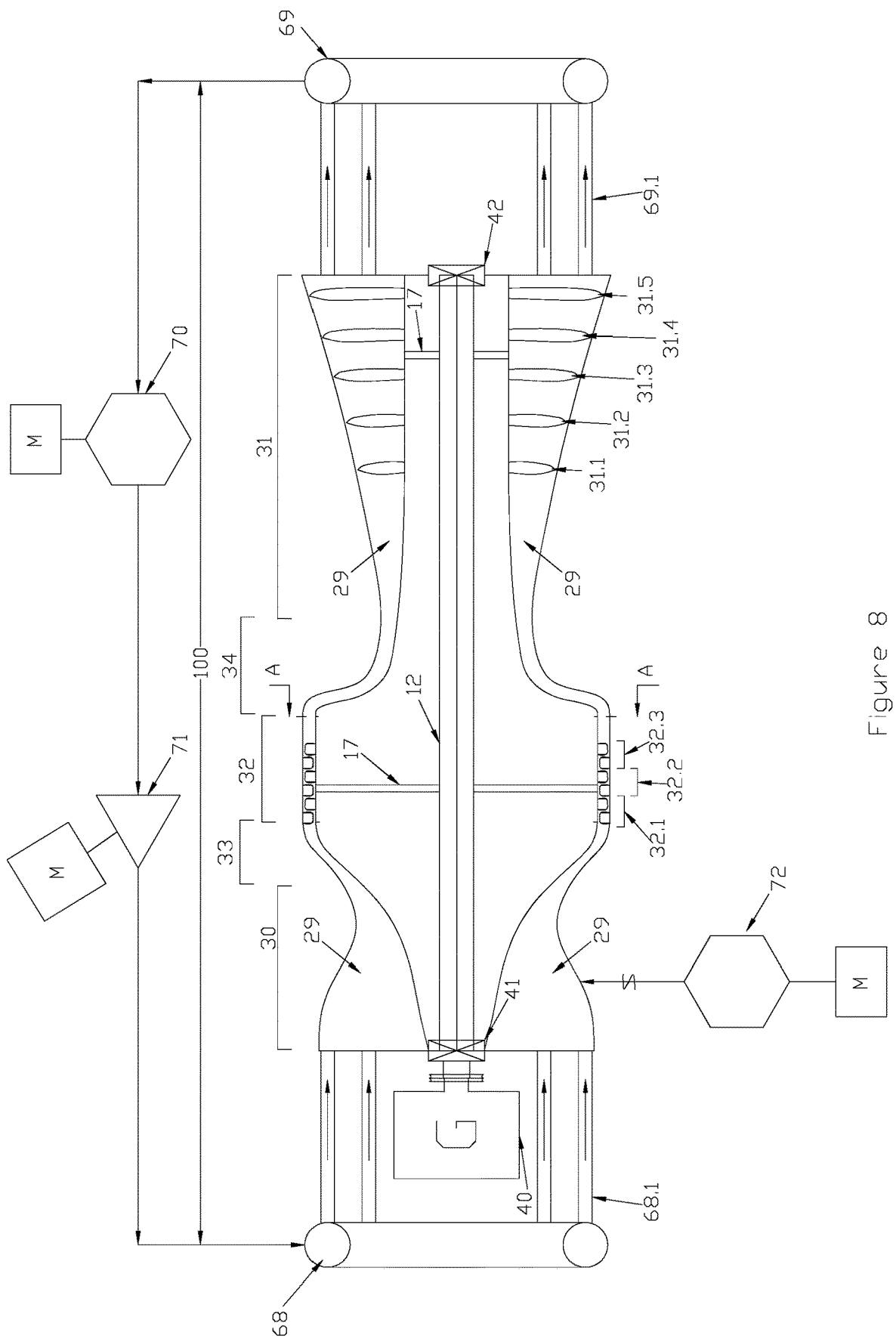
FIG. 8 is a schematic drawing of a segmented augmented turbine assembly with a recycle line and an illustrative embodiment of the present invention.

FIG. 8 is a schematic drawing that shows the set up for evaluating and testing a prototype of the SAMWAT technology. It depicts a recycle, pressurized mode of operation that includes cooling (71) and pressurization (72) of the recirculating flow stream. The images also depict the elements required to integrate the ducted channel section of the turbine assembly (29) to the channel of circular cross-section (69-69.1 and 68-68.1) required for the recirculation propulsor (70).

Figure 9A:
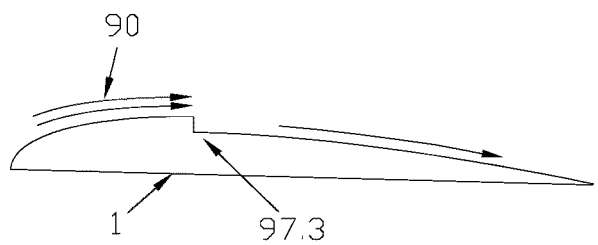
FIGS. 9A-9C are schematic drawings of geometric shapes designed into surfaces of a fluid channel for dealing with early boundary level separation, in accordance with an illustrative embodiment of the present invention.
Figure 9B:
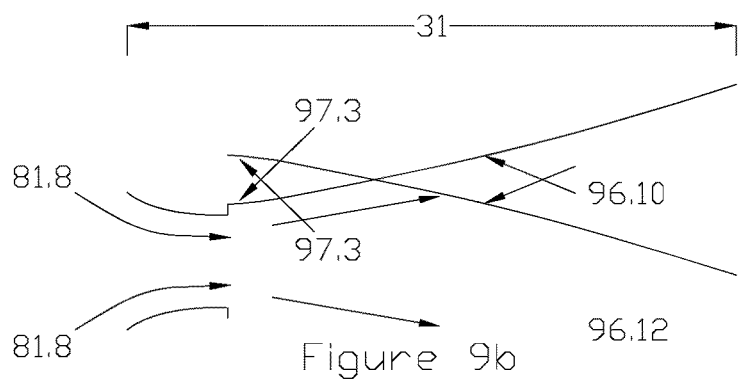
Figure 9C:
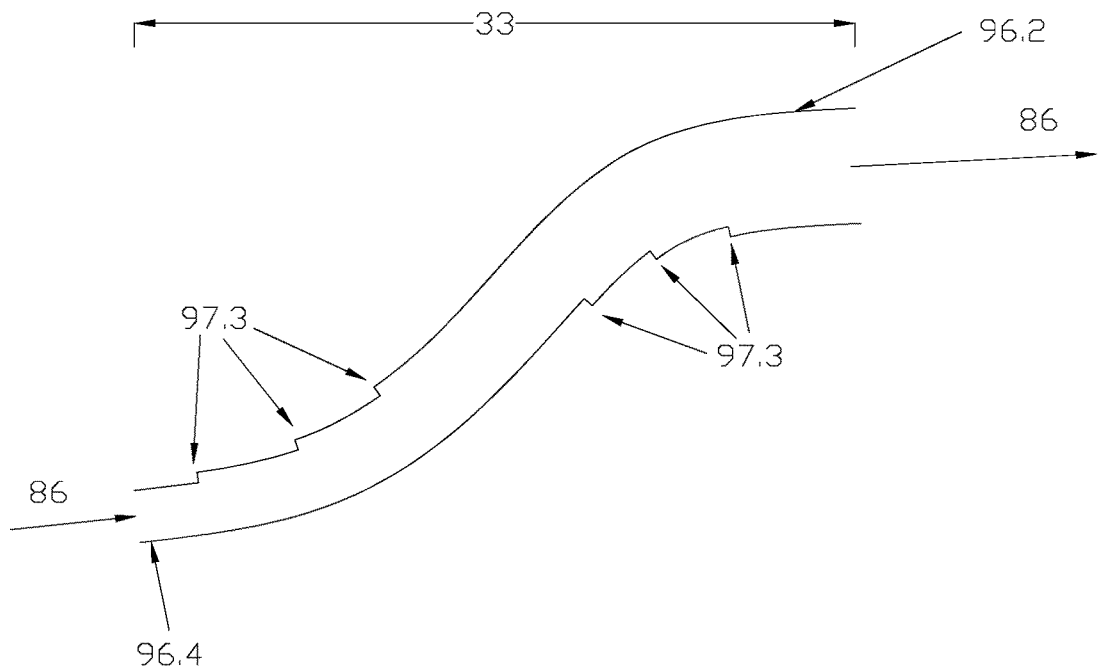

FIGS. 9A-9C illustrates three applications that will be employed in the design to deal with the problem of early boundary layer separation when a flow stream is passing over a rounded surface. An effective solution is known as the Cuanda effect whereby a geometric shape is inserted into the face of surface once its direction of flow has changed from the equivalent of an up slope to a down slope, and one of the most common shapes used is called the backward step (97.3). FIG. 9A is for flow over a blade, FIG. 9B is for flow through the inlet of a diffuser, and FIG. 9C is for flow through a transfer section to and from an outward extended nozzle throat.

Figure 10B:
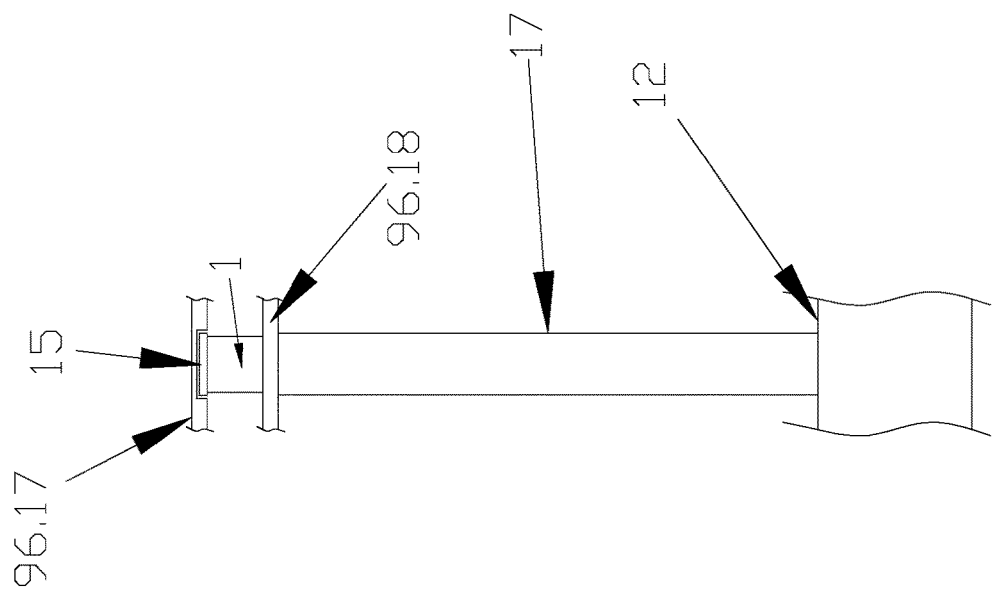
FIGS. 10A and 10B are schematic drawings of rotor blades connected by a connecting ring, in accordance with an illustrative embodiment of the present invention.
Figure 10A:
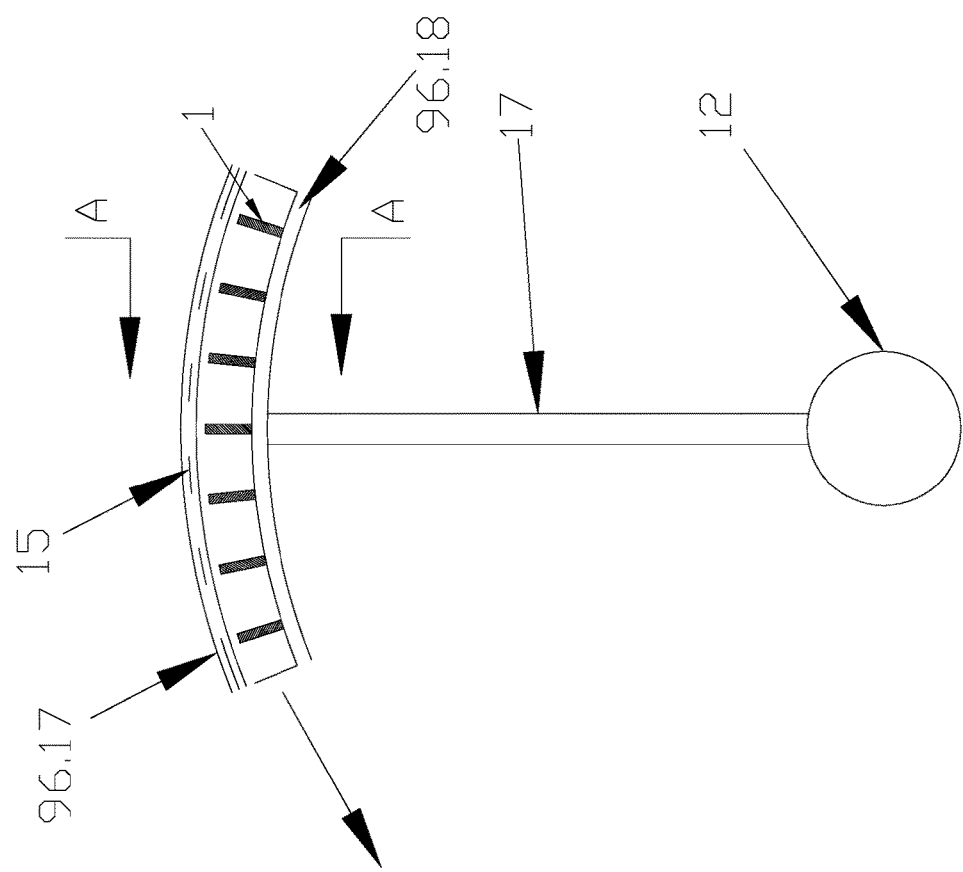

FIGS. 10A and 10B illustrate the use of a connecting ring (15) that connects the tips of the blades to reduce the stresses produced over the blades by a high velocity flow stream. The connecting ring can rotate in a grove cut into the inside face of the stator, in this situation the length of the blade is covering the entire channel and there are no blade-tip losses. In some instances, such as the high-speed turbine-rotor (211) in the thruster diffuser exhaust (FIG. 14A), both ends of the turbine-rotor blades and the inner and outer walls of the ducted channel are connected, whereby the outer wall of the ducted channel is serving as the connecting ring. Blade-tip losses are eliminated and the severe stresses over the blade surfaces are reduced.

FIG. 11 is a schematic drawing of a legacy high bypass jet-engine used to power commercial jets. The central spool, driven by the exhaust from the combustion chamber, is driving the bypass fan to produce a stream of cold thrust (bypass air) and a stream to feed air to the compressor section and combustors of the jet-engine. The combustors in the jet-engine are replaced by electric heaters in the SAMWAT-T.

Figure 12A:
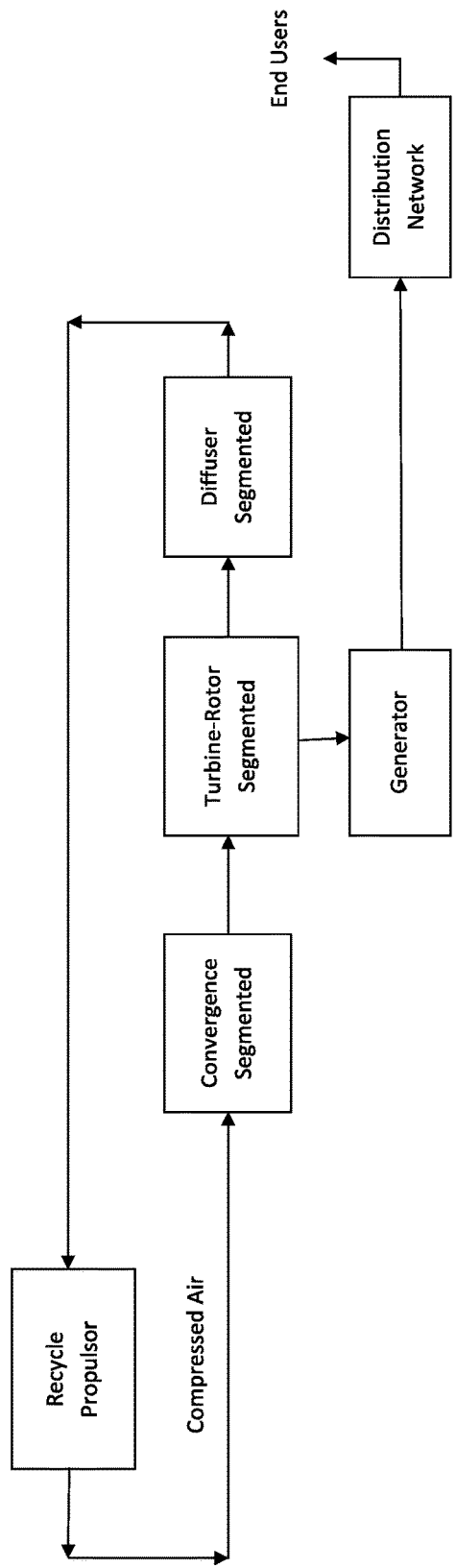
FIGS. 12A and 12B are flow charts for the operations of segmented augmented turbine assembly for generating electricity from a fluid in motion and a system for providing thrust to an aircraft, respectively, in accordance with an illustrative embodiment of the present invention.
Figure 12B:
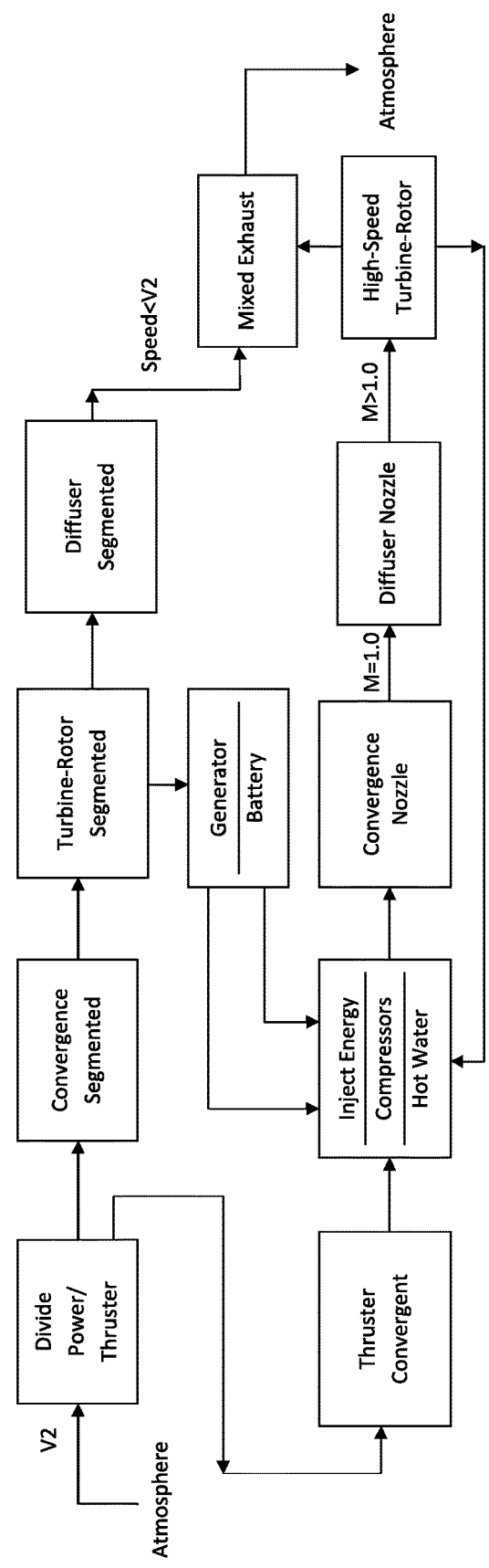

FIGS. 12A and 12B are flow sheets that illustrate the difference between the operations of a 'SAMWAT-E/G (Generator) and an embodiment, the SAMWAT-T (Thruster). Essentially the compressed air generator is supplying the electricity necessary to drive the thruster unit operations and both units are integrated into a common assembly that attached to the wings replaces the legacy turbofan jet-engine.

Figure 14A:
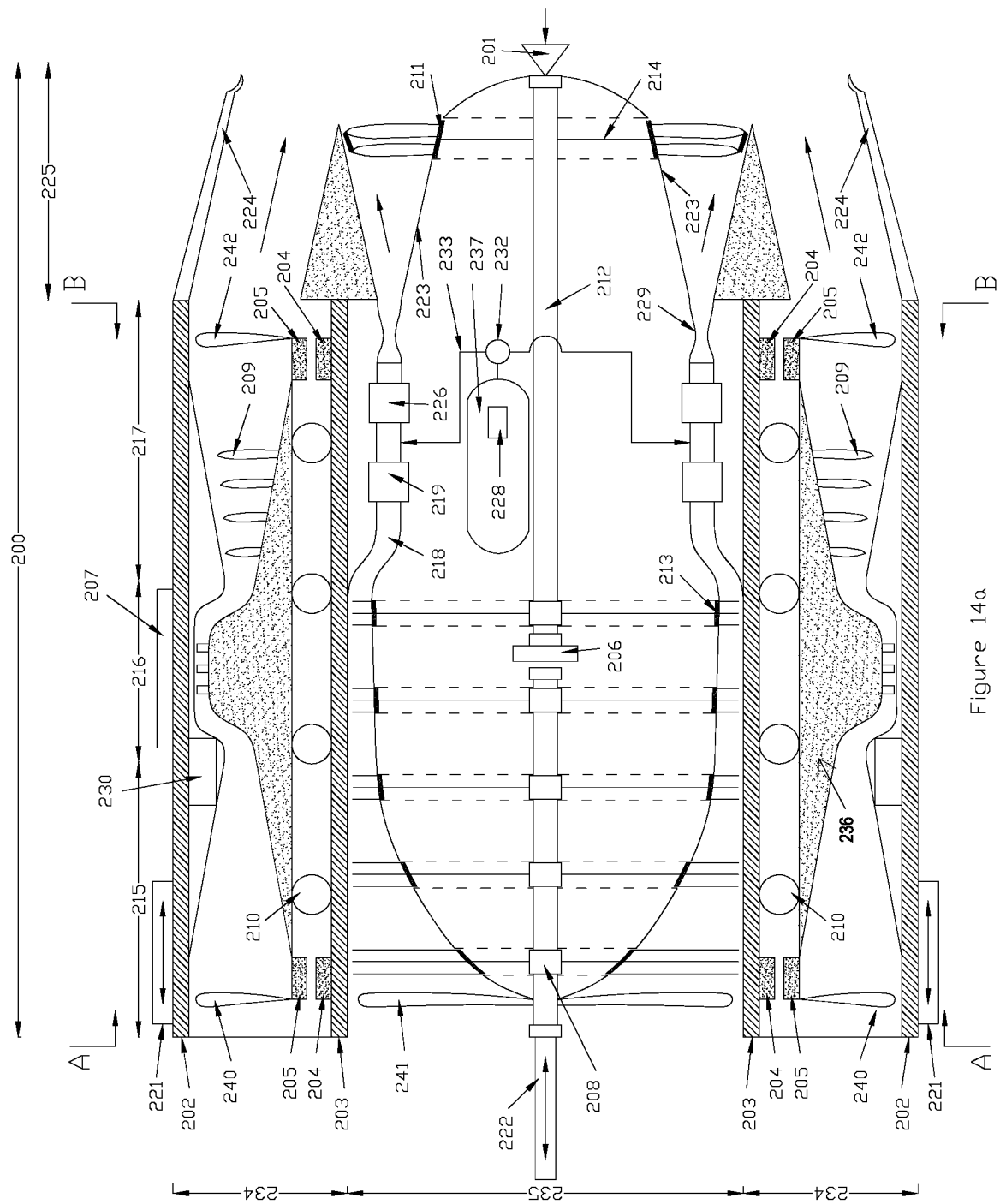
FIG. 14A is schematic drawing of a system for providing thrust to an aircraft, in accordance with an illustrative embodiment of the present invention.

FIGS. 13A and 13B are schematic drawings of the operation of the partition control mechanism (219/FIG. 14A). This mechanism is inserted into the ducted channel (218) that has been partitioned into equal flow areas called flow channels. By raising or lowering individual control elements of each flow channel, the flow can be stopped, reduced or diverted into an adjacent flow tube. FIG. 13A depicts the position of control elements of various flow channels.

FIG. 13B depicts how four flow channels (4, 5, 7, 8) have been diverted into one flow channel (#6).

FIG. 14A is a schematic of a SAMWAT-Thruster wherein an inlet flow stream has been divided into two flow streams in two sections of the assembly. One flow stream feeds a SAMWAT-E/Generator assembly located in the power section. The power generated is then concentrated into the thruster section, using motorized compressors, electrical heaters (228) and a C-D nozzle to maximize the velocity of the discharge jet. The energy-density of the thruster flow stream is maximized just before entering the C-D nozzle, whereby the choked flow condition of the diffuser discharge converts the energy-density to maximum velocity. The C-D diffuser discharge passes through a two stage, high-speed turbine-rotor that powers the last stage of high-speed compressors in the convergent section.

Figure 14C:
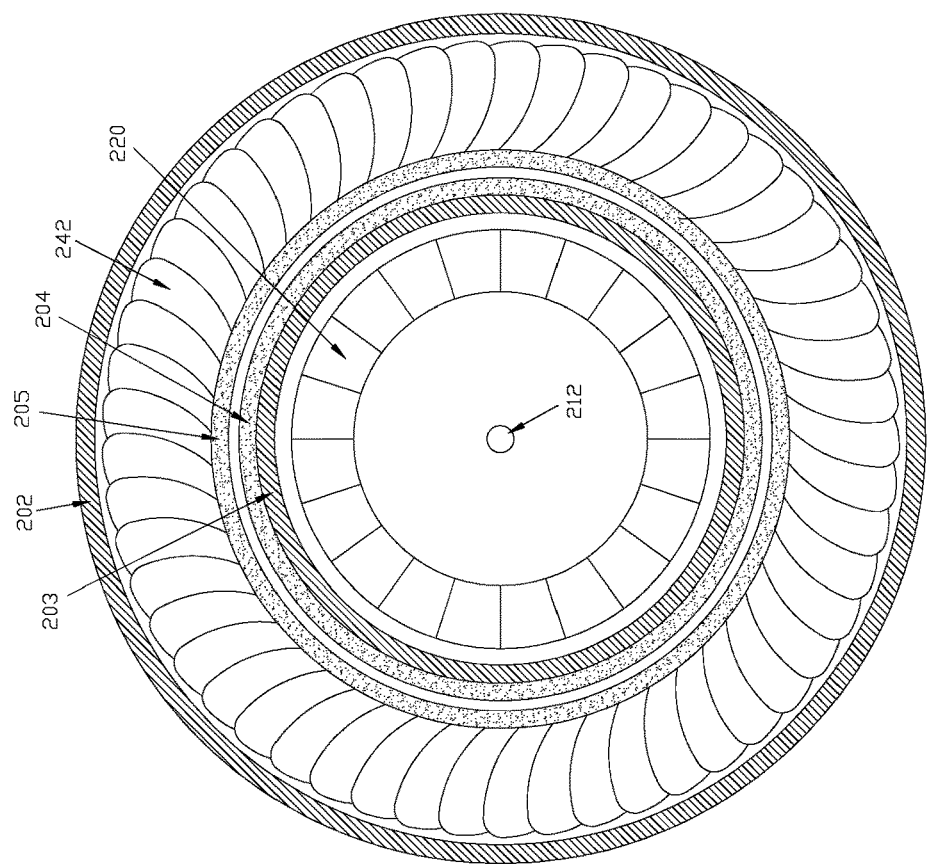
FIGS. 14B and 14C are schematic drawings of the inlet and diffuser, respectively, of the system of FIG. 14A.
Figure 14B:
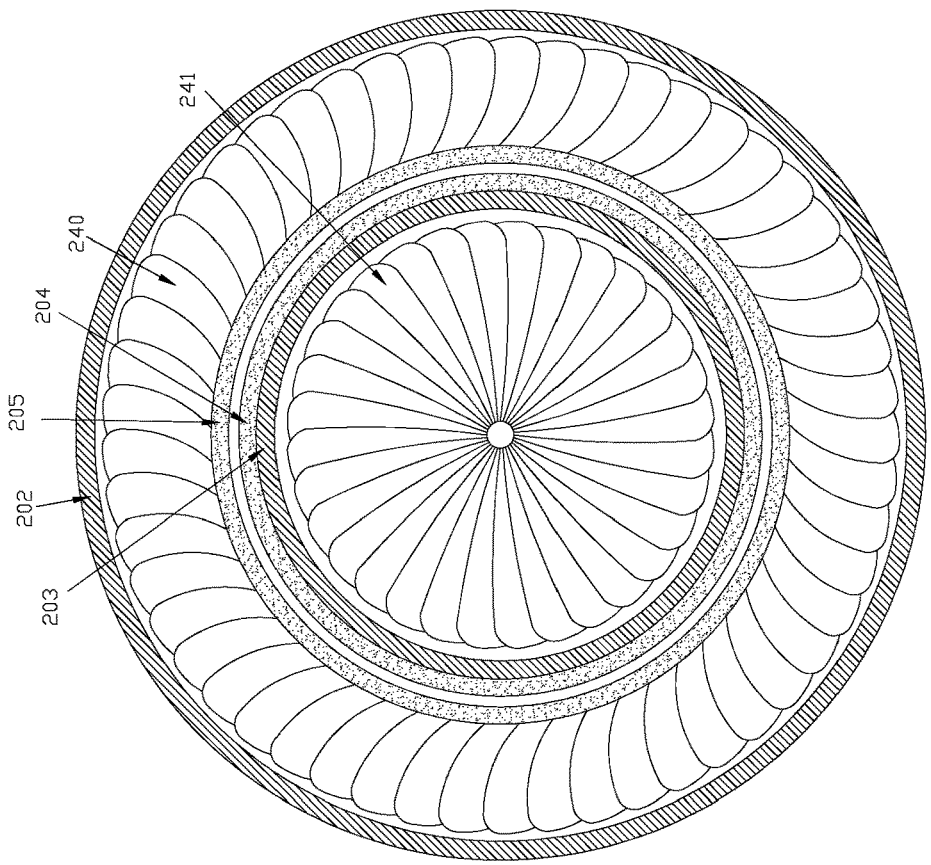

FIG. 14B depicts the arrangement of the inlet face of a thruster with two cylindrical walls (202 & 203) dividing the total enclosed surface area into power section and thruster section, the two inlet propulsors are feeding the power section and the thruster section and the end faces of the main generator rotor and stator (205 & 204). The modular main battery (230) is thermally insulated and installed around the outside face of the exterior wall of the power section (202).

FIG. 14C is an end view of a SAMWAT-Thruster and depicts the diffuser discharge of the C-D nozzle of the power section using a motorized propulsor (242) to create an air-curtain and the discharge from the partitioned diffuser of the SAMWAT-Thruster (220). The partitioned diffuser will continue to the rear to pass through the high-speed turbine-rotor (211). The high-speed turbine-rotor shaft (212) is shown in the center of the figure. The low velocity power and high velocity thruster exhaust flow streams (224 & 223) intersect to eventually produce a mixed exhaust in the atmosphere, which becomes the exhaust mixing section (225).

Figure 15:
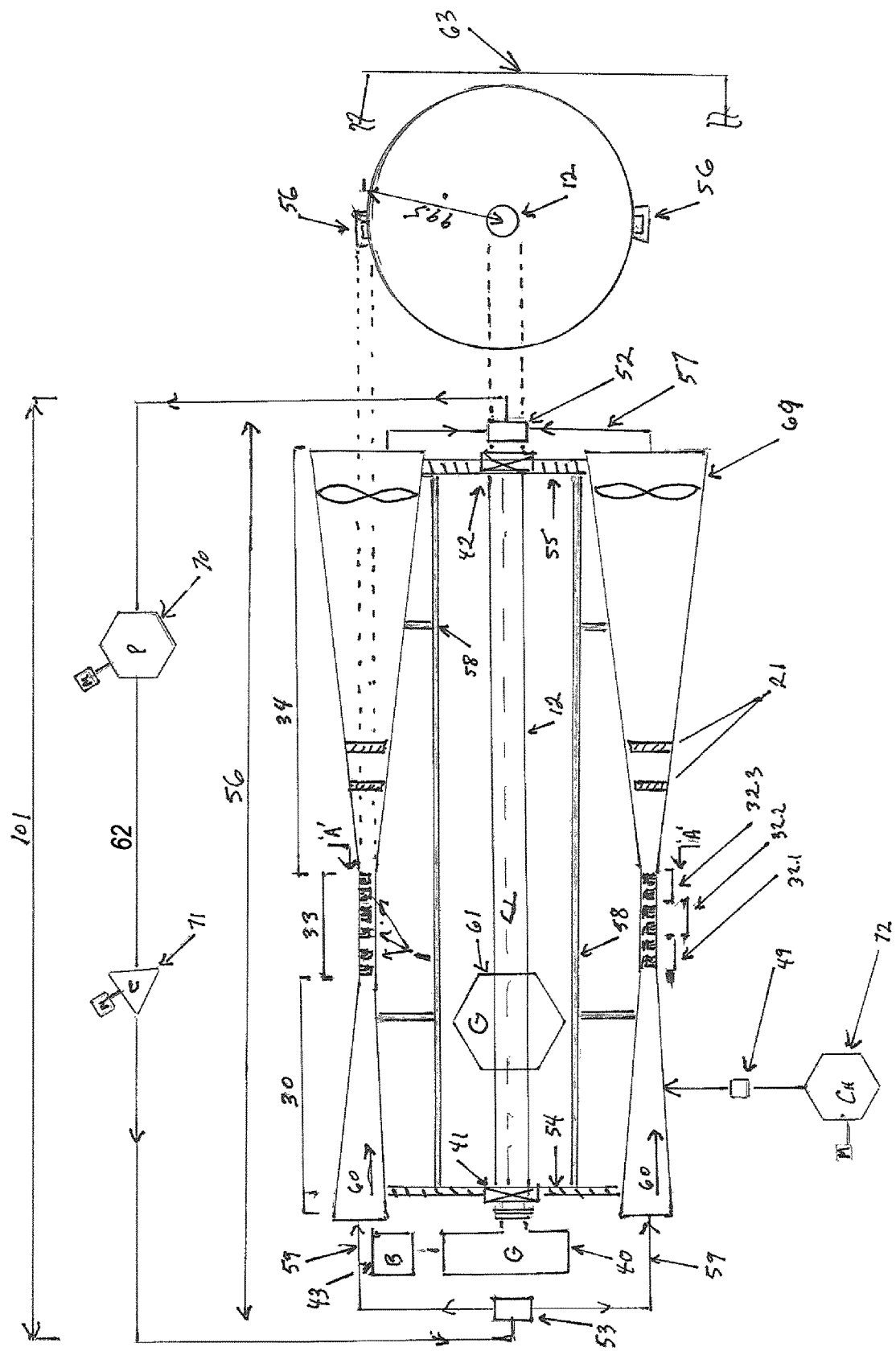
FIG. 15 is a schematic drawing of a segmented augmented turbine assembly with a recycle line and an independent channel, in accordance with another illustrative embodiment of the present invention.

FIG. 15 is a is a schematic drawing that shows an alternative the SAMWAT technology that incorporates independent flow channels (56). It depicts a recycle, pressurized mode of operation that includes cooling (71) and pressurization (72) of the recirculating flow stream.

The present disclosure teaches a segmented, augmented fluid turbine for producing power and electricity by incorporating multiple innovations, one of which is dividing the annular fluid flow channel of the turbine assembly into multiple independent flow channels that transmit flow stream energy to multiple corresponding bladed areas that are connected by a rotor to a central rotating shaft for producing power.

The moment produced on the rotating shaft is the product of the force applied by the flow streams passing over the blade's surface multiplied by the radius of the circumference of the blades. The 'work done' on the turbine-rotor shaft that will be converted to electrical power is the product of the moment (M) applied to the shaft multiplied by the shaft's angular displacement (theta). It is important to note that it is the 'work done' on the shaft that is converted to energy; energy is not produced by the moment applied to make the shaft rotate.

As will be seen in further detail below, over 50% of the flow channel in a SAMWAT can be sealed (zero flow) by reducing the cross-sectional area after introducing solid inserts that are attached to the rotating inner wall of the flow channel. Filling part of the flow area with these solid inserts will progressively decrease the percentage of the bladed area of the flow channel at the turbine-rotor, and the decrease in flow area can extend throughout the entire ducted channel.

A plurality of turbine-rotor stages are provided and configured to extract power from the flow stream, and the bladed area of each turbine-rotor stage discharges directly into a similar downstream stage until the last stage that is preferably located towards the end of the diffuser section. The position of the last extraction stage will depend on the flow velocity at the diffuser inlet because the number of stages of turbine-rotors in the diffuser section increase as its inlet velocity increases. In situations with low inlet diffuser velocities, there may be no extraction rotors in the diffuser section.

The design of a SAMWAT is dependent on an evaluation of the shortest length of blade and smallest bladed cross-sectional area appropriate for a given application. These two criteria will produce the most efficient SAMWAT as they both serve to maximize both the radius of the rotor and the flow velocities (force applied) over the blades, and consequently the 'work done'.

At a constant mass flow rate (Q), the radius (r) of the segmented turbine-rotor can be increased by a certain extent without a further shortening of the length of the blades (L). As the radius and circumference of the turbine-rotor increase, the bladed cross-sectional area should be constant to hold the flow velocity (V) constant over the blades, as $V=Q/A$. Inserts of known cross-sectional area are fastened to the face of the rotor to maintain the length of its circumference that has blades, otherwise known as the bladed area (A).

In other words, if Q, L, and A are constant, then V is constant even though r has changed. A very important SAMWAT concept is its ability to maintain both the cross-sectional bladed-area and the blade length constant as the rotor radius increases. The control of the size of the bladed area is an important tool in maximizing the 'work done' by the turbine-rotor in a SAMWAT. It should be noted that the bladed area (A) does not correspond to 'circular swept area' as per common wind turbine terminology.

The use of a maximum radius (r) increases the turbines performance by contributing to maximizing the moment (M) produced on the turbine-rotor shaft as per the formula $M=F\times r$. The flow parameter V is important as the force applied (F) to the blades will be a function of the velocity cubed. The force applied is in fact the lift generated (reaction blade) or the momentum transferred (impulse blade) by the flow over the face of the blades.

Maximizing the force applied to the blades by generating a maximum fluid velocity contributes proportionately to maximizing the moment produced at the shaft. Maximizing the radius of the rotating blades also contributes proportionately to maximizing the moment. To maximize the moment produced on the central rotating shaft, as will be discussed in further detail below, the SAMWAT uses different effects such as:

1. Installing inserts in the flow channel that are attached to the face of the rotor to control the flow velocity by adjusting the bladed cross-sectional area;
2. Minimizing the bladed cross-sectional area of the turbine-rotor by segmenting the annular flow channel, around its circumference, into a portion of sealed segments and a portion of open, flow through segments;
3. Maximizing the radius of the moment arm between the turbine-rotor and its rotating shaft (centerline of blades to centerline of rotating shaft);
4. The deployment of power extraction turbine-rotors in the diffuser section to avoid jet flow conditions at the diffuser inlet and transferring the moment produced by the diffuser-rotors to the rotating shaft of the turbine-rotor;
5. Augmentation of the energy-density that involves a convergent and diffuser employing high area ratios (a C-D nozzle application) to maximize the energy-density and velocity of the flow stream at the throat inlet;
6. Adding transfer sections to both ends of a C-D nozzle to extend the throat section beyond (outside) the centerline of the convergent and divergent sections; and
7. Employing the narrowest possible, segmented, annular flow channel that directs the flow stream over blades at the most outer periphery of the turbine-rotor that requires blades of minimum length.

Within a SAMWAT, an increase in the flow velocity is the result of having increased the energy-density of the fluid flow stream (units of $J/m^3$) and this without any injection of additional energy into the inlet fluid flow stream. The energy-density of the flow stream of a SAMWAT is lowest at the inlet of its convergent section and is at maximum at the inlet to the first stage of the turbine-rotor section.

Maximizing the energy-density of the flow stream is mainly achieved by progressively minimizing the cross-sectional area of the fluid flow channel between the annular convergent section inlet and just before the annular inlet of the first stage of the turbine-rotor section. Additionally, there is a progressive maximizing of the cross-sectional area between the last stage turbine-rotor and the diffuser discharge. Poor diffuser efficiency is the biggest risk to good performance involving C-D diffuser applications.

In progressing from the convergent inlet to the 1st stage rotor of a SAMWAT, the energy content of the flow stream (units in Joules) is not changing, however the energy-density (units in $J/m^3$) is increasing towards its maximum. Maximizing the energy-density also maximizes the flow stream velocity over the blades of the SAMWAT and this increase in flow velocity is achieved without the injection of additional energy to the inlet flow stream.

Advantageously, the first section of a SAMWAT is always a convergent section with low inlet velocities and a maximum area ratio (inlet/discharge) to accelerate the flow stream.

In summary, the SAMWAT design maximizes the flow velocity and the force applied (F) on the blades and the length of the radius (r) at which the blades are rotating. By producing these conditions, it inherently maximizes both the moment (M=F×r) applied to the turbine-rotor shaft and the 'work done'. In turn, this maximizes the power that can be produced by a connected generator. The SAMWAT is designed to maximize 'work done' in converting fluid energy, and then efficiently converting the 'work done' to various forms of energy.

The parameters F and s (s meaning distance which can replace r) have a direct impact on the amount of 'work done' on the rotating shaft of the turbine-rotor. The 'work done' by a rotating machine is defined as: $W_m$=M (or F×s)×theta (angular displacement by the shaft). The SAMWAT maximizes the 'work done' by a rotating shaft by maximizing internally the flow stream energy-density/velocity and the turbine-rotor radius.

In comparison to legacy turbines, one can identify this additional work produced by two categories: 'Machine-Force Work Done' (MFWD) that is based on the incremental additional force applied to the blades, and 'Machine-Distance Work Done' (MDWD) that is based on the incremental additional distance inserted between the rotating shaft and the centerline of the blades. Legacy power turbines were not designed to produce either maximum MFWD or MDWD, but some legacy designs do produce more MFWD or MDWD.

For example, the energy-density of the flow stream at the inlet of a legacy steam turbine remains relatively constant (or decreases) up to the turbine blades as there is little or no decrease in the cross-sectional flow area unless related to changes in fluid specific volume. Rather long blades of steam turbines extend over most of the radius of the rotor and are positioned around the entire circumference creating a large, evenly bladed area.

The velocity (V) over the blades is relatively low as the result of mass flow Q divided by a high bladed area A: (V=Q/A). There are two alternatives to increase V; more energy must be injected to raise the mass flow rate (Q) or the bladed cross-sectional area must decrease. The solution of the SAMWAT is the opposite to that of legacy turbines: it purposely minimizes both the bladed and the stream flow cross-sectional areas to maximize the flow velocities over the blades.

Axial flow fluid turbines have been used for over a century to produce electricity. The preferred fluid used in the turbines are steam, water and wind but other fluids such as compressed air and compressed gases can be used. Compressed air/wind can be produced anywhere, and high pressure compressed air much like pressurized steam can produce a lot of moment/torque when it is passing over the blades of a turbine at high velocity.

Wind can easily be compressed by the introduction of axial and radial turbine rotors in the convergent section of a C-D nozzle turbine assembly. The airplane jet-engine is a good example of a machine converting wind into compressed air with a much higher energy-density by progressively decreasing the cross-sectional area of the flow stream and injecting energy through stages of mechanical compression.

In an embodiment of the SAMWAT-E/G that produces thrust, the 'work done' by one part of a divided intake stream (the power section) is extracted and transferred into the other part of the flow stream (thrust section). The power extracted in the form of electricity is used to increase the energy-density of the other part by transferring the electricity to motorized fans and compressors and to heating the flow stream prior to passing through a C-D nozzle that converts high pressures to velocity/acceleration and then to thrust.

At a certain point, this will create a machine that is autonomous in terms of energy-in, depending upon the amount of 'work done' by the 2-part machine-assembly. This means that the energy entering through the air intake can suffice to produce more 'work done' (net thrust) than that needed to overcome the drag on the plane and to climb.

Applying heat that is created from the electricity produced greatly expands the volume and the velocity of the flow stream and this increases the thrust produced, as the thrust produced is proportional to the velocity squared. As heat from electricity is replacing the heat produced by the fuel burned in the combustion chambers of a jet-engine, one could call this 'clean heat'.

Electricity does have the advantage of producing pure heat without producing hazardous gases and compounds that corrode or coat the equipment and pollute. To obtain an equivalent thrust, the maximum temperature of operation and associated stresses will be much lower using electricity for heating compressed air rather than jet fuel. As regards wearing parts, the lower temperatures and clean air allows for the use of less exotic materials that will have a longer life.

Producing electricity in the power section of the thruster also permits storing energy in a rechargeable battery located around the outside perimeter of the thruster assembly. Surplus electricity produced when the demand for thrust is low is drawn upon to produce additional or peak thrust at times such as takeoff and landing. The batteries are modular to eliminate a complete failure (fire or short circuit) and are completely isolated from the airplane and its thrusters. Isolation strips (243) divide the battery into independent modules, so if one module is lost the remaining modules continue to operate.

The operations of the common high-bypass jet-engine is somewhat similar to that of a SAMWAT in that the inlet air flow to the engine is accelerated and then divided and some of the power from the hot circuit (combustion stream) is used to drive the turbofan that provides inlet air for both the jet-engine and the bypass streams. The turbofan output is dependent on the rpm of a turbine-rotor powered by the combustors and not on the variable rpm of an electric motor.

As a fluid stream for generating distributed electricity, compressed air is advantageous over H.P. steam as it is not excessively hot and is safer and easier to handle. The basic SAMWAT-E/G design for electrical power generation starts with the concept of a ducted, C-D nozzle design with an extended throat to accommodate a turbine-rotor section.

In non-recycle mode, wherein the diffuser section exhausts to atmosphere, an airstream is directed to an inlet propulsor that feeds the convergent section. This accelerated flow stream then passes through the multi-stage compressors to the turbine-rotor, that drives the generator, and then exhausts through the diffuser section.

In recycle mode, cooled, pressurized, recycled air is compressed, and energy is extracted from the flow stream as it travels over the blades and then decompresses in the diffuser section before being recycled to the convergent inlet by a motorized propulsor.

In most steam power generation turbines presently operating, a high pressure, high temperature flow stream is being fed to a non-annular turbine that discharges into a diffuser section, to a vacuum pump, to a condenser, to a condensate return pump and then back to the boiler.

A SAMWAT steam generator uses its internal technologies to increase the energy-density of low-pressure steam to resemble the energy-density of mid-pressure steam at the blades and as such demonstrates the clear advantage of SAMWAT in all applications of converting fluid motion to energy. SAMWAT simply makes more 'work done' with less energy input and with increased efficiency: a flow of low energy-density is converted into flow of higher energy-density by simply properly applying the technology of a C-D nozzle and fluid mechanics as per Bernoulli.

In the SAMWAT-E/G design, the throat of the C-D nozzle has been extended in length, and possibly offset, to install an annular, multi-stage, turbine-rotor assembly. The offset is desired for additional performance, but it lengthens the C-D nozzle configuration, and this is not always possible. The flow stream entering the convergent inlet simply needs to input enough energy (total pressure) to continually increase its velocity and decrease its static pressure until it reaches the inlet of the throat (the inlet of turbine-rotor section).

The flow continues over the 3-segmented turbine-rotor stages that includes guide-vanes & blades and this produces a moment on the turbine-rotor shaft. The bladed area of the rotor was reduced to maintain a maximum flow stream velocity over the blades at the design flow rate. The segmented rotor extracts power more efficiently as the flow conditions over the blades are more uniform and with much less induced turbulence and is the result of synchronizing the rotational speeds of the flow/blade/guide-vane.

The discharge from the nozzle throat enters a diffuser section that serves to recover the energy from the discharge stream of the turbine-rotor. After passing the throat inlet, the negative static pressure created by the rapid increase in velocity will gradually increase over each stage of turbine-rotor work extraction, until the remaining negative pressure in the diffuser discharge is converted to a positive static pressure by the injection of energy by the recirculation propulsor. If operating in non-recirculating mode, the remaining negative pressure in the diffuser is dissipated when the diffuser flow stream is vented to atmosphere.

A number of processes, technologies and techniques have been integrated into the SAMWAT design, such as:

1. Augmentation: the use of a C-D nozzle to maximize the energy-density, and respectively the fluid velocity, through its extended annular throat that is equipped with multiple turbine-rotors. The convergent section compresses and accelerates the fluid velocity, whereas the diffuser section decompresses and decelerates the flow. Maximizing the fluid velocity by means of augmentation involves no additional operating cost as no additional energy is required in the inlet flow stream.

The energy of the flow stream remains constant over the C-D nozzle, (as per Bernoulli) but the energy-density of the fluid stream and consequently the stream velocity over the blades are maximized in the throat. The centerlines of the C-D nozzle throat and turbine-rotor are extended outwards by the addition of transfer sections at the convergent discharge (33) and the turbine-rotor discharge (34/FIG. 7A)

This extension serves to increase the radius of the turbine-rotor with respect to its line of center of rotation. Maximizing the flow stream velocity by augmentation maximizes 3-key parameters; the force applied (F) on the blades, the moment on the shaft (M) and the Work (Wm) done based on the shaft rotation. It provides a variable component of the 'work-done' that can be identified as the 'Machine-Force Work-Done' (MFWD).

2. Annular rotor: the use of a ducted, annular rotor to concentrate the fluid stream energy strictly around the outer periphery of the circular turbine-rotors of largest possible radius. Without the use of an annular rotor the entire radius of the rotor will be wetted, and the flow velocities will be much lower for all mass flow rates (FIG. 1A).

3. Segmented ducted channel and rotor: Prior art turbines use an open, non-segmented flow channel (4) that uses the face of the stator wall (5) to support guide-vanes that do not rotate (9.18, FIG. 1A). The ducted channel that transports the fluid stream and the turbine-rotors are segmented into two categories that creates sealed segments and open flow through segments. Increasing the number of sealed segments allows for a decrease in the open area of the rotor. Without any sealed segments, the rotor remains a standard swept rotor with a 100% bladed area (FIGS. 2A and 2B).

4. Maximum torque arm radius (99.5): By reducing the open area of the rotor it is possible the maximize the length of the arms of the turbine-rotor (99.5) while keeping both the mass-flow rate and the velocity over the blades constant. Maximizing the radius of the bladed-area maximizes the moment applied to the rotating shaft and involves no additional operating energy cost: This increase in radius provides a variable component of the 'total work-done' on the shaft identified as the 'Machine-Distance Work-Done (MDWD)' (FIG. 2A).

5. Inserts attached to the inner wall of the annular channel: Solid inserts are attached to the face of the inner wall of the annular channel that serve to deflect a continuous flow stream into separate segments. The total width of the inserts applied corresponds to the area of the ducted channel that will become the non-bladed area. The heads, walls and tails of the inserts have different shapes in order to provide desired aerodynamic effects and flow stream properties. But most importantly, the inserts serve to decrease the percentage of bladed area as the radius of the rotor is maximized and this increase in radius increases the component of the MDWD (FIG. 3).

6. Adjustable bladed area: By changing the ratio of the sealed segments to flow-through segments the bladed area of the rotor is adjusted. Decreasing the bladed area allows an increase of the velocity over the rotor blades at a fixed mass-flow rate and increases the component of MFWD. Depending on the streamflow velocities employed, the segmented section of the flow channel will extend through the turbine-rotor section and may extend, partially or fully, through the convergent and diffuser sections (FIG. 2A).

7. Blades and guide-vanes: The segmented flow stream (7), the rotating blades (1.1-1.16), and the rotating guide-vanes (10.1-10.12) are all located in open flow-through segments and are rotating at the same velocity (synchronized). There is no crossflow between segments nor between the elements of a flow segment. As such the blades and guide-vanes are stationary relative to the flow stream; there is only axial flow provided by the stream flow and no tangential (cross-directional flow) by the blades, the guide-vanes or the flow stream itself. This is considered a most stable, uniform flow condition and will favor high performance at subsonic and transonic fluid velocities (FIG. 3).

The blades and guide-vanes will be oriented at an angle to axial flow to set up the most efficient flow path over the blades but none of the 3-elements are moving tangentially relative to each other. There is an option #2 (97.2) to revert to rotating rather than option #1, stationary guide-vanes (97.1) and this will be discussed further (FIG. 3).

8. Diffuser energy extraction rotors and an air curtain discharge: Very high flow velocities are obtained throughout the sections of the turbine assembly that creates a particularly serious problem of jet-flow at the diffuser inlet. The installation of multiple power extraction stages (31.1-31.5/FIG. 8) along the length of the diffuser creates backpressure that reduces the possibility of jet-flow developing. These diffuser extraction stages transmit useful torque transmitted by a torque support arm (17) to the turbine-rotor shaft (12) and the diffuser body (31) serves to recover and transfer momentum forward towards the turbine-rotors as the flow stream is decelerating.

Early boundary layer separation is a notorious problem when operating diffusers that, as in this instance, discharge to the atmosphere. The root of the problems lies in the geometry of the diffuser itself. The angles of the outside wall create a low-pressure area at the diffuser discharge. This low-pressure area is continuously fluctuating, and flow disturbances are migrating/pulsating from the discharge into the main body.

These fluctuations set up conditions for early boundary layer separation along the walls that drops the diffuser efficiency substantially. The solution for this problem is to establish a diffuser discharge propulsor (242/FIG. 14A) of enough power to create an air curtain over the face of the diffuser discharge. This air curtain isolates the downstream turbulence from the body of the diffuser.

9. Control of flow velocity and flow direction between the inserts: The flow velocity over the length of a segmented flow tube can be adjusted by changing the distance between the faces of the walls of the inserts (99.4) that create the flow tube segments. This is achieved simply by varying the width or direction (99.3) of adjacent faces of the inserts. This is an effective technique for controlling precisely the flow stream velocity and direction when passing directly over the blades (99.1) and guide-vanes (99.2) and for maintaining a constant flow stream velocity starting from the convergent discharge to the diffuser inlet (FIG. 4).

10. Equalization of the static pressure over the rotor stages: The downstream static pressure following a turbine-rotor stage consisting of guide-vanes and blades can be re-energized by connecting the downstream channel to the upstream pressure available at the convergent discharge. This is achieved by cutting appropriate longitudinal and latitudinal channels in the body of the solid inserts (FIG. 5).

11. Powering the fluid in recirculation mode: In instances where the SAMWAT can operate in closed circuit, the diffuser discharge flow is returned to the convergent inlet by an inline powered propulsor. Accordingly, there is no energy lost from the system by allowing the diffuser discharge to vent to atmosphere. The properties and cleanliness of the fluid stream flow remain constant (FIG. 8).

12. Powering the fluid flow stream in open discharge mode: In open discharge mode, the convergent inlet and diffuser discharge are open to the atmosphere and to atmospheric disturbances. In the SAMWAT design, the flows to the convergent inlet and from diffuser discharge are assisted by motorized fluid propulsors. As mentioned, in the case of the diffuser discharge the propulsor needs to input enough energy to create an air curtain over the face of the diffuser discharge.

13. Pressurizing the fluid flow channels: Fluid density increases with increased system pressure. Higher fluid density will serve to decrease the physical size of a turbine assembly for a desired power output. In a closed recycle operation of a SAMWAT, the system is sealed, and operating pressure is maintained by an independent compressor and control system. Problems of early boundary layer separation will decrease at higher operating pressures (FIG. 8).

14. Cooling of the fluid flow stream: In a sealed system with recirculation all the fluid flow and equipment friction losses are converted to heat. If this heat is not removed, the fluid temperature and vapor pressure will increase to system failure. A standard chilling system and fan cooled radiator control the system temperature to below 100 degrees Celsius (FIG. 8).

15. Source of distributed power: As in the case of solar power, the SAMWAT in recycle mode can be installed everywhere and can operate independently of the power grid. Their operation will require a small distribution network but no transmission grid, whereby reducing the delivered cost/kWh. A SAMWAT operates with a rechargeable battery that serves to start-up or assist in SAMWAT operations.

16. Miniaturization of the turbine: In order to have the maximum power output with a turbine-rotor assembly of minimum physical footprint, the implementation of the listing of actions above will serve to miniaturize the turbine as they contribute to the following attributes at a constant mass-flow rate: maximum flow stream energy-density, fluid density and velocity to produce maximum force, maximum torque arm to produce maximum moment, maximum work done, minimum flow turbulence, minimum tangential cross-flows, minimum mass-flow rate per kW produced, optimum aerodynamics and fluid dynamics and maximum operational efficiency through appropriate management and control of all important operating parameters.

The above all serve to reduce the size of the turbine necessary that will reduce its cost for operation and installation.

17. Control of the operations: This technology offers a full control of all key variables including; constant adjustable feed rate, adjustable flow energy-density, adjustable electrical power, and an operation at constant rpm. Each unit can be continuous monitored and controlled remotely. Units can be fully programmed for peak power production and in the event of a natural disaster this decentralized power will not stop operating.

18. Cuanda effects: The SAMWAT technology will employ high and very high velocities in the fluid streams. Early Boundary Layer Separation (BLS) will be a problem in at least 3-key areas: 1. at the transition from increasing slope to decreasing slope on the surface of the blades, 2. at the face of the inner wall of the inlet to the diffuser section, 3. In the curves of the transfer channels leading to and leading away from the turbine rotor section. At these specific points a backward step or other geometric shapes will be cut into the surfaces to promote the Cuanda effect of the boundary layer following the face of the curved surface (FIG. 9).

19. Ringed blade-tips: High fluid velocities can be employed by this technology and hence the forces applied against the blades can be correspondingly high. The stresses created over the length of the blades may necessitate special materials and reinforcement at the root of the blades to avoid rupture. To reduce the stresses generated over the length of the blades, the blade-tips will be attached together by a structural ring or cylindrical shape that encircles the outer circumference of the turbine-rotor blade-tips (FIG. 10).

The ring will travel in a groove cut into the inside wall of the stator as this will not result in any unnecessary blockage of the flow channel and the length of the blade will not be decreased. This ring will also eliminate blade-tip losses as the blade will extend to and possibly beyond the inner face of the rotor and stator walls. The outer ring can be replaced by a conical cylinder that operates as the outer wall of the ducted channel.

20. Producing electricity on site to displace fossil fuel. Electricity, instead of jet-fuel, is used to heat a flow stream such that its expansion in an enclosed space will increase the pressure in the enclosure that will accelerate the speed at which the fluid accelerates to escape to the atmosphere.

However, there exists innumerable simple applications where inexpensive electricity could replace fossil fuels as a heat source. The application above only illustrates that the sky is the limit.

21. Work Done: Applied Physics in SAMWAT design: Both energy and 'work done' have the Joule as its unit of measure. This technology is based on the application of the 'Principals of Work Done' that essentially can be translated into the following statements as energy produced represents the sum of the 'work done' on an object.

22. 'Work done equates to energy produced' and 2-corollaries: a) 'More work done equates to more energy produced' and finally, b) 'No work done equates to no energy produced'.

To illustrate the advantages taught by the present disclosure, two cases can be examined which teach different philosophies that involve 'work done' from the energy of the same inlet flow stream:

Case 1: Legacy turbines were designed to produce 'the equivalent work done' from the energy contained in its inlet flow stream that then converts the equivalent work done to the equivalent energy produced.

Case 2: SAMWAT technology is designed to produce 'maximum work done' from the energy contained in its inlet flow stream that then converts maximum work done to maximum energy produced.

As will be shown, the SAMWAT energy components of MFWD & MDWD produce the additional work done which is the difference between the maximum work done and the equivalent work done.

As It is known, work is defined by the formula:

$$W = F \times s : (F=\text{force}), (s=\text{distance})$$

and work done on a rotating shaft is defined by moment and rotational displacement:

*Wm=M×theta (displacement angle) or (Wm=F×s×theta)
Wm=rotational work-done (J, ft lb.), Torque or Moment (Nm, ft lb.): theta=displacement angle, (radians or rpm (2 pi radians/revolution).

For example, a machine shaft acts with moment 300 Nm. The work done is:

$$Wm = (300 Nm)(2pi)$$
$$= 1,884 J$$

SAMWAT technology is based on operating a turbine-rotor with a maximum radius at the center of the blades. Highest velocity is also important as it represents the force applied to the blades, but maximum radius is easier and more economically achieved as it requires a simple change in the percentage of bladed area of the turbine-rotor. The radius of a SAMWAT rotor could be infinitely long, but the length of the blade must then be infinitely short. There are difficulties in employing infinitely short blades that will be evident to an experienced turbine-rotor designer. There is however an 'optimum-minimum' blade length.

A pipe wrench is a simple demonstration of the importance of length/radius to the moment/torque produced (length is equal to s in the above formula for work done). The 4-cases depicted in Table 1 below show why maximum radius is so important to increase 'work done'.

Assume a fluid flow is passing through a turbine-rotor. Case number 1 represents the base case for a turbine-rotor of radius 1-unit of length and the rotational displacement is 1-rpm. The energy out, Wm, is calculated based on the formula identified above by the symbol (**).

TABLE 1

| | Net Energy Produced Based on Work Done (per unit) | | | | | | | | |
|---|---|---|---|---|---|---|---|---|---|
| # | Energy of flow injected to Inlet (units) (1) | Mass Flow (2) | Flow Area (3) | Force/ Velocity (m/s) (4) | Rotor Radius (5) | Moment (6 = 4 × 5) | Gross Work Done per rpm ** (7 = 6 × theta*) | Heat/ Friction loss (8) | Net Work Converted Into Energy (J) (9 = 7 − (8 + 1)) |
| 1 | 1 | 1 | 1 | 1 | 1 | 1 | 1 | .5 | −.5 |
| 2 | 1 | 1 | 1 | 1 | 2 | 2 | 2 | .5 | .5 |
| 3 | 1 | 1 | 1 | 1 | 4 | 4 | 4 | .5 | 2.5 |
| 4 | 2 | 2 | 1 | 2 | 4 | 8 | 8 | 1 | 5 |

*theta (displacement) is constant for all cases and equals 1-rpm.
** assumes the braking power of the generator equals or exceeds the gross work done, otherwise generator overspeed.

Table 1 above shows the relative changes in net 'work done' when certain operating parameters of a turbine are modified. The above table assumes a worst case, wherein the heat losses are equal to 50% of the energy injected.

In case 2, the rotor radius (5) has been doubled and this has doubled the momentum and gross work done. Cases 3 & 4 are indicative that the force (4) and radius are both important parameters in producing more gross work done (7) and consequently play an important role in maximizing the amount of net energy produced (9).

Power is the rate at which work is done or energy converted. If more 'work done' is achieved per unit of time, then both the energy produced, and power are increasing.

The above table respects the 1st Law of Conservation of Thermodynamics. This law simply states that energy can neither be created or destroyed (conservation of energy). Thus, power generation processes and energy sources involve conversion of energy from one form to another, rather than creation of energy from nothing.

Increasing or decreasing the energy-density of the flow stream by respectively decreasing or increasing the cross-sectional area of the flow channel does not imply a change in the energy of the flow stream; only a change in energy-density.

The C-D nozzle is a perfect example of the effects of energy-density change with change in the cross-sectional area of a ducted annular flow stream. Although the velocity of the flow stream in the throat may be several times higher than at the convergent inlet the total energy of the flow stream remains constant (as per Bernoulli).

Maximum velocity is achieved in the SAMWAT turbine by applying the techniques of augmentation and annular channels. In legacy turbines, higher velocity is achieved by injecting more energy into the inlet flow stream and this involves a bigger fuel cost for the energy produced. Maximum radius in a SAMWAT is achieved by segmenting the rotor and channel and that has 2-advantages; 1. A bigger moment is achieved without additional energy injection or fuel cost, and 2. the effects of increased torque/moment are understood by people as they see it applied in their daily life.

Summarizing, the production of energy requires the production of 'work done' to drive the conversion process. The energy in the form of the 'work done' on an object will equal the energy converted from the object. If more work is done; then equally more energy is converted. As energy represents the sum of the 'work done' on an object, more 'work done' means more energy.

With legacy turbines, the design philosophy was to maximize the energy in the inlet flow stream, usually by maximizing its pressure and temperature. This increases the force applied at the blades but every increase in steam pressure is the result of increased fuel consumption, or in the case of hydro power, the result of a higher hydraulic head.

The functionalities of a SAMWAT turbine are not simply producing and converting 'work done' by the energy of the feed stream, but to use principals of physical mechanics built into the turbine assembly to maximize the 'work done' from the energy of the inlet stream.

The principles of augmentation and annular rotor design concentrate the energy of the flow stream, increasing its energy-density without burning additional energy to increase steam pressure and temperature or by adding hydraulic head to a water turbine. As mentioned, the SAMWAT is uniquely designed to provide 2-variable components of the total work that are derived from the energy of a flow stream entering a turbine, namely: The Machine-Force Work-Done and the Machine-Distance Work-Done.

Descriptions of various key SAMWAT unit operations will now follow:

Segmenting the Annular Flow Channel

In the case of a non-segmented (standard) annular rotor, as its radius increases at the same flow rate, the length of blades must decrease proportionally to maintain a constant blade velocity. Otherwise, there is a corresponding decrease in the speed of the fluid over the blades and a decrease in the force generated. There comes a point where increasing the radius leads to blades so short, they lose efficiency and increased frictional losses from walls positioned very close together also lower the power output.

FIG. 1A shows a standard bladed rotor with a continuous circular rotor, whereas FIG. 1B shows the same rotor once it has been segmented into six segments. There are now three open flow-through segments (3.1-3.3) and three sealed segments (2.1-2.3) that were created by fastening appropriate inserts (8.1-8.3) to the outer face of the inner wall (6) of the ducted channel. The bladed area of the rotor has been decreased by 50%, but the radius of the rotor has remained the same as before and the number of blades has decreased from 18 to 9 units.

Each segment is either sealed by installing an insert that blocks any flow through the end facing the convergent or the segment remains fully open. The fully open segments create an enclosed flow tube, whereby the fluid from the convergent can freely travel over multiple stages of guide-vanes and blades transmitting torque to the central rotating turbine-rotor shaft.

The ratio of the rotors open area to sealed area is variable. By progressively 'sealing' more ends of segments with more inserts, the open area of the flow channel is decreased. By this reduction in flow area, the radius of the annular channel and the rotor can be increased such that the velocity over the blades will not change at a constant mass flow rate. This sealing of segments allows for a rotor with a longer radius that will produce more work with the same length of blade and the same mass-flow rate.

As it operates with zero sealed segments, a standard rotor will always have an open, bladed area of 100%. A segmented rotor, using blades of the same length can have different bladed areas and using rotors with much different radii. FIG. 1 illustrate how inserts can be used to segment the area of a rotor into multiple segments with different bladed areas.

FIGS. 2A and 2B illustrate how a small radius standard rotor of twelve vanes and twelve blades (13/FIG. 2A) can be converted into a segmented rotor with an equivalent number of blades and equivalent bladed area but having a much larger radius.

An equivalent bladed area of the rotor illustrated in FIG. 2A is repeated in the flow-through segments at the 3, 6, 9 and 12 o'clock positions in the rotor of FIG. 2B. This concept of equivalent bladed area is applicable for different combinations of rotor radius, of flow-through width and of ratios of open flow-through segments to sealed segments.

Eliminate Tangential Blade Travel

An annular, axial flow channel has been segmented into a set of sealed segments and flow-through segments that rotate together. The walls of the flow-through segments are created indirectly as they are in effect formed by the edges of two adjacent inserts. As the segmented rotor turns there is no rotational momentum transferred to the fluid flow by the rotation of the blades; it is only the walls of the inserts that apply the rotational forces to the fluid.

The rotor blades and the fluid stream passing axially over them are now both rotating at the same speed. There is no tangential movement of the blades perpendicular to the flow stream, the fluid is travelling axially along the flow tubes and over the blades in a mode similar to an airplane wing.

The guide-vanes rotate with the blades to remove none-axial momentum entrained into the fluid stream by its passing through the blades of the preceding rotor stage. They also support the desired flow path over the blades. The stable disposition of the guide-vanes relative to the blades and the removal of all tangential rotation allows for a higher axial fluid velocity over the blades before reaching the critical speed of Mach 1.

None of the energy of the flow stream is spent forcing the blades to rotate tangentially through the fluid stream and thus creating undesirable flow turbulence. The flow conditions in segmented flow-through channels is now like gently generating lift from an airplane wing. Without segmenting the flow channels the conditions are like generating lift from a rotating helicopter blade.

Blades (1.1-1.3/FIG. 3) and guide-vanes are mounted in stages on the inner wall of the annular flow channel (22.1-22.3/FIG. 3) and this within the flow-through segments, whereby the blades and guide-vanes do not rotate tangentially through the axially descending fluid flow stream (11/FIG. 3) to minimize flow turbulence.

Maintaining a Constant Velocity Over the Turbine-Rotor

As illustrated in FIG. 3, the cross-sectional, bladed area of the flow tubes (3.1-3.3) can now increase or decrease to correspond to any reduction in the volume of the channel brought about by the space occupied by the blades and the guide-vanes. As illustrated in FIG. 4, the control of the velocity of the flow stream in a flow tube (3.1) is now obtained by adjusting the distance between the faces of the adjacent inserts (99.4) that form the walls of the flow tubes. The direction of the flow stream in a flow tube corresponds to the angle between the wall and the line of axial flow (99.3).

Also, as the fluid stream passes directly around the guide-vanes, the walls of the flow-through segments can now be oriented to match the angle of flow of the guide-vanes (99.1). This will minimize losses and turbulence between the walls, blades and vanes. Hence, the flow velocity before, over and after the vanes and blades of all three stages (32.1-32.3) remains constant and aligned with the direction of the guide-vanes. It is preferable and possible to decrease the flow velocity before the guide-vanes and then accelerate it to design velocity at the thickest point of the blades. Further acceleration of the flow stream, immediately before the blades, will help to re-align the flow stream and to dissipate existing flow turbulence.

Maintaining an Even Static Pressure

It is possible to reduce the difference between the static pressures in the downstream of each of the three stages of the turbine-rotor as illustrated in FIG. 5. The inlet pressure to the second and third stages of the rotor are decreased to approach the static pressure provided by the convergent at the inlet to the first stage rotor. This approach could also be adopted in rotor stages located in the beginning of the diffuser section as there will be considerable energy extracted at the higher flow velocities that exist early in the diffuser.

Longitude and latitude canals are cut into the bodies of the inserts (8) of the sealed segments (2.1, 2.2) adjacent to the flow tubes. These canals serve to equalize the flow stream pressure at the vanes of the downstream rotor stages with the pressure from the convergent discharge (11). This feature is like a re-heat process at the first stage of a steam turbine; it will increase the power produced by rotor stage rotors downstream of the first stage.

FIG. 4 illustrates the typical canals cut into each insert and their connection to the flow tube segment (3.1). The canals are cut into the bottom-half of the insert that is attached to the face of the turbine-rotor. The face of the rotor may be indented to make a mirror image of the face of the rotor as this would double the volume of the canals and make flow easier between zones of uneven pressure.

Preventing Jet-Flow in the Diffuser

High air speeds will lead to conditions favoring boundary layer separation and jet-flow throughout the turbine assembly but particularly at the inlet to the diffuser section. An aerodynamically efficient wall geometry at the diffuser inlet will not be sufficient to prevent jet-flow at the high velocities envisaged and this would greatly reduce diffuser efficiency.

As a solution the diffuser section is also segmented and equipped with multi-stage rotors & blades that will extract energy more rapidly from the diffuser flow-through segments and will provide necessary backpressure on each flow stream, thus avoiding jet-flow conditions.

As illustrated in FIGS. 7A and 7B, by connecting the six additional rotors of the diffuser (21.1-21.5) to the central shaft of the turbine-rotor (12), additional torque is available for the generator (40). However, to further decrease the possibility of jet-flow, the turbine-rotor efficiencies may be lowered in favor of more backpressure that can be obtained by changing the blade configurations.

Maximizing the Energy-Density

There are multiple unit operations that occur as the fluid stream passes through a SAMWAT. The sectors of the processes that make up the SAMWAT (100) are depicted in FIG. 8. From beginning to end these include: 1. a convergent section for accelerating the fluid flow (30), 2. a convergent transfer channel (33) which moves the centerline of the annular, segmented-channel (29) to a greater radius (33), 3. a segmented turbine-rotor section (32) for extracting power from the accelerated fluid stream by segmented turbine-rotor stages (32.1-32.3) that transmit a force to the connecting arm (17) and a moment to the turbine rotor shaft (12).

The discharge of the segmented turbine-rotor section feeds the diffuser transfer channel (34) which relocates the centerline of the annular segmented-channel (29) to a smaller radius to feed the inlet of the diffuser section (31). Multiple diffuser-rotors (31.1-31.5) are inserted into the annular segmented-channel to extract power from the flow stream in the diffuser and to provide backpressure in the diffuser section to prevent jet flow conditions from developing in the diffuser inlet.

The diffuser section discharges into multiple diffuser discharge pipes (69.1) positioned around the periphery that transfers flow to a common discharge header (74) feeding a propulsor that recycles the flow stream back to the convergent feed header (73). Individual feed pipes (68.1) that are connected to the feed header provide a uniform flow to connections around the periphery of the inlet of the convergent section (30).

The annular segmented-channel is the tool used to integrate the above-mentioned process operations and it is the tool that allows a SAMWAT to maximize the energy-density of the inlet flow stream. In order to maximize the energy-density of the flow stream it is necessary that the cross-sectional area of the segmented flow channel at the convergent inlet be progressively decreased to a minimum at the inlet to the segmented turbine-rotor section.

The minimum distance between the walls of the segmented channel and the turbine rotor will be very close to the length of the blades of the turbine-rotor. It necessary that the cross-sectional area of the same segmented flow channel at the turbine-rotor exhaust be progressively increased to approximately its initial cross-sectional area at the convergent inlet. Otherwise, the energy-density of the flow stream is not maximized and the SAMWAT will not produce best results.

This has required that the segmented flow channel integrate firstly the wall configuration and operations of a ducted C-D nozzle and secondly integrate the said nozzle into a continuous, annular, segmented-channel section operating with a segmented turbine-rotor section and possibly a system wherein all sections of the SAMWAT operate with a segmented flow channel. The higher the flow velocities achieved, the greater the need for the stable flow conditions provide by segmenting the flow channel. The annular flow channel had also to be integrated into the non-annular flow channel of a recirculation system.

Airplane-Mode Lift

Legacy axial flow turbines operate based on a rotor and its blades rotating tangentially through a fluid flow stream that is travelling through the turbine-rotor section parallel to the turbine-rotor rotating shaft. Often, the guide-vanes are stationary as they are attached to the stator and only the blades rotate through the flow stream that is travelling axially through the turbine assembly. The reactive forces applied to the blade are the result of the axially and tangential flow vectors and the tangential forces will lead to considerable turbulence in the flow stream. This operation resembles that of a helicopter blade that is creating lift.

The SAMWAT turbine blades operate in a different, more stable environment. In a SAMWAT the guide-vanes may be stationary relative the fluid flow; this means that both are rotating at the same speed and the guide-vanes are attached to the turbine-rotor. In this situation the guide-vanes rotate with the blades and the inserts and the is represented as option 1 in FIG. 3. This is the preferred option as the guide-vanes are not consuming energy nor creating turbulence by rotating tangentially through the flow stream, As illustrated in option 2 of FIG. 3, the stationary guide-vanes may appear to be rotating through the flow stream, but in fact the fluid stream is rotating through the stationary vanes as the guide-vanes are attached to the interior walls of the stator.

Option 1 is preferred as there will be less turbulence created in the flow stream as the guide-vanes, blades and fluid flow stream are all rotating at the same speed and the reaction force created by the flow stream passing over the blades will essentially all be from axial flow. As a person of skill in the art would understand, this new flow pattern is created by segmenting the ducted channel, whereby the fluid stream, the blades and the guide-vanes are all rotating at the same speed with little axial flow. This may lead to the elimination of the guide vanes as the losses they generate in the form of drag may exceed their benefits by directing the flow stream over the faces of the blades. As such, in an embodiment of the present invention, the guide vanes are not required.

Miniaturization of the Generator

The higher the flow velocity (energy-density) over the blades and the higher the turbine-rotor radius, the smaller will be the physical size of the unit for a given power output. Increasing the density of the fluid will also decrease the physical size of the unit. Smaller physical units are cheaper to build and operate. Producing competitive power requires the energy-density of the feed to the convergent and the area ratios of the convergent and diffuser to be sufficiently high. Increasing the density of the fluid will also serve to miniaturize the SAMWAT for any given power production.

Reducing Power Delivery Costs

Power grids are a major problem. When extreme weather and flooding arrives, and the grid is most needed, it is most susceptible to failure. Maintenance costs and transmission losses throughout the grid are large and increasing. SAMWAT is a distributed source of power, like solar, but is more suited to multi-dwelling hook-ups.

Retrofitting SAMWAT Technology to Existing Turbine Designs

There are parts of the SAMWAT technology that could be applied to existing axial flow fluid turbines. Possibilities exist in the area of axial flow steam generators and in the field of hydro turbines. There are many industrial installations in the world where 150 to 300 psi, (low pressure) boilers produce process steam for heating, drying, evaporating, distilling, etc. There exist many process operations whereby waste heat in exhaust chimneys and stacks can be recovered to produce low pressure steam.

Given the excessive cost of the power produced, the present legacy steam turbine is not used to produce electricity by cogeneration with low pressure stream. The SAMWAT is an excellent solution for co-generating electricity from low pressure steam boilers and low-pressure heat recovery installations. In these instances, the additional fuel cost and operating costs are negligible, so the cost per kWh produced will be low.

Pressurized Recirculating System with Chiller

A SAMWAT can operate as a pressurized recirculating system, as pressurized flow streams help to diminish problems of boundary layer separation. Pressurization is provided by a small compressor and storage tank that are connected to the flow stream channel at appropriate locations. A set point pressure is set for the small compressor and it will hold the entire system at the set pressure. The compressor only operates when it is necessary to replace any compressed air that may have been lost due to leakage in the system.

A SAMWAT operating in recirculation mode will continue to build up heat from the friction caused by the moving fluid stream. Heat will be generated over the turbine-rotor blades, over the blades of the recycle propulsor and from heat from moving parts such as bearings (41, 42) or electrical heat if the generator were to be located within the frame of the turbine assembly. This heat generated must be removed.

The proposed solution for removing the said heat is to pass the flow stream over finned coils located within or outside the assembly that is recirculating a refrigerated fluid inside the coils. Heat removal is only a problem if the system is operating in recycle mode, but if not removed the heat will continually build up until at some point the system will possibly seize or blowup.

Interfacing Ducted Flow to Circular Flow

The operational velocities involved in SAMWAT technologies are high and cover a large range and are presently subsonic. At the circular inlet to the recycle propulsor the flow velocity will be of order of Mach 0.05. There is a big transition in both flow speed and flow geometry and a relatively seamless transition is required or there will be major problems of boundary layer flow separation and loss of efficiency.

The transition in flow geometry from annular diffuser exhaust to circular propulsor inlet is made using a system of multiple pipes distributed uniformly over the end plate of the diffuser discharge that then connects to a larger diameter circular header (233) that has multiple connections to a circular central flow channel that feeds the propulsor.

The end plate has a surface configuration that funnels the flow over its face towards the pipes and is keeping the speed of deceleration of the flow as even as possible over its entire face. As necessary, flow velocities in each pipe may be measured and controlled. For the transition from the propulsor discharge to the convergent inlet the geometry is vice versa.

SAMWAT-Thruster

There are multiple embodiments of the SAMWAT that are possible, and one such embodiment is applicable to the operation of a new generation of thruster for accelerating airplanes, drones and other flying craft. The embodiment, shown in FIGS. 14A-14C, is identified as the SAMWAT-Thruster (200) and can become the world's first commercial supersonic thruster for commercial airplanes.

The thrust required to propel a legacy jet-airplane is created by mechanical compression of intake air followed the addition of heat to further increase its pressure and then the energy of the pressurized stream is converted to a high velocity jet stream using a C-D nozzle. In this invention we will repeat many of the same operations, but differently. Firstly, by using electricity produced by the speed of the aircraft to power the system rather than by burning jet fuel. The other unit processes such as compression, flow acceleration, control, decompression, operations are all reorganized into a more efficient machine.

The same principals and laws apply to a jet-engine or a SAMWAT-Thruster. Once the pressure, temperature, and energy-density has been increased, as is the case within the core section of a turbofan jet engine, a rapid expansion/acceleration of the combustion flow stream takes place as it escapes towards a lower pressure of one atmosphere. The rapid action of the acceleration of the stream away from its point of highest energy produces an equal force or thrust in the opposite direction. A level of thrust is required to overcome the drag on the moving aircraft and once that level is exceeded it allows the plane to move forward.

In turbo-jet engines the combustion of fuel serves to drive axial compressors and a turbofan and to rapidly increase the volume of the incoming compressed airstream by quickly increasing its temperature in an enclosed space and letting it accelerate rapidly as it discharges at high velocity to atmosphere through a nozzle of set dimensions. The rapid acceleration of a fluid flow stream to high velocities is the principal driver for generating thrust and based on the equation $F=M \times a$ (where F=force, M=mass and a=acceleration). A typical arrangement for a turbofan jet-engine is illustrated in FIG. 11.

A turbofan jet-engine produces thrust from two sources; the combustion of jet-fuel in a pressurized air stream (hot thrust) and by accelerating a part of the air intake using only an axial flow turbo-driven fan with no heat from combustion (cold thrust). The cross-sectional areas of the intakes and discharges of the hot and cold thrust flow streams are fixed so the discharge mass flows are related to the intake mass flows plus the weight of the fuel consumption. As mentioned, the acceleration of the flow streams into the atmosphere towards the rear of a jet engine of an airplane will create an equal and opposite forces that will accelerate the airplane forward.

At low mass flow rates and at low cruising speeds, the discharge velocities drop proportionally to the change in flow rate, producing lower thrusts per unit of mass flow. To obtain more thrust per unit of mass requires the capacity to decrease the discharge cross-sectional area of the discharge and whereby increase or hold the discharge velocity constant. This problem can be solved by partitioning and controlling the flow streams to manage the power they produce.

Thrust is a force that is calculated from the formula: $T=m \times v$, or $T=p \times A \times v^2$ where T=thrust (units of Newtons), m=mass flow rate, v=speed of the exhaust gases relative to the speed of the plane or rocket, A=area of the discharge, p=density of the fluid stream. As T is proportional to v squared, it is understandable that the design of any thruster should be focused on maximizing the velocity of the exhaust gases of said thruster.

Doubling the mass flow rate increases the thrust by a factor of 2 times, whereas tripling the discharge velocity increases the thrust by a factor of 9 times. Tripling the velocity and the density of the flow stream increases the thrust by a factor of 27 times ($3 \times 3 \times 3$). The mass flow rate, density and velocity are the principal factors that need to be addressed for an airplane to obtain enough thrust from its cold thrust flow stream to overcome the forces of drag and eliminate the need to burn fuel.

Three objectives of this embodiment are to present a system that could operate without fuel by incorporating the following features: 1. manage the discharge area of the cold thrust flow stream (5:1 turndown ratio) by adjusting the discharge area of the diffuser assembly to better match the mass flow rate, 2. maximize the discharge velocities and mass-density of thrust flow stream at low plane speeds. 3. inject enough input air at take off speed (approximately 235 km/h or 65 m/s) with enough energy to produce the thrust necessary to support flight of the aircraft at minimum drag, plus 10% for climb. The required thrust at minimum drag plus 10% will be expressed as the 'break-even thrust'.

The SAMWAT-E/Generator is designed to maximize two variable components of the total work derived from the energy of an inlet flow stream: The Machine-Force Work-Done and Machine-Distance Work-Done. In the case of the SAMWAT-Thruster, a third and fourth operating parameter can increase the 'work done', that being the maximized velocity and maximized density of the thruster exhaust streams.

As this machine is designed accordingly, Machine-Velocity Work Done 'MVWD' and Machine-Density Work Done 'MDWD' can be added to its contribution to increasing work done. This additional work will increase the difference between it and the equivalent work done by traditional designs.

The inlet air flow stream of the SAMWAT is immediately divided into two separate parts, forming a 'power part or power section' and a 'thruster part or thruster section'. All the above management of flow parameters takes place in either the power or the thruster section.

As mentioned, a difference between the operation of a SAMWAT-Thruster and a legacy turbo-jet engine resides in the fact that a SAMWAT-Thruster does not burn fuel; there is no combustion or other exothermic reaction involved. Maximum electrical energy is extracted from the power part of the divided flow stream and this energy is directed to producing thrust and charging a battery integrated into the operation.

In a jet-engine, the heat of combustion is purposely used to heat the combustion exhaust air but no heat, besides by friction, is injected into the cold bypass air, even though the bypass circuit of a turbofan jet engine supplies some 85% of the total thrust. The energy-density of the bypass stream is increased but it is not blasting through a C-D nozzle. Its increase in discharge velocity is the product of the energy added by an axial bypass fan and some compression achieved by reducing the cross-sectional area of the flow stream as it proceeds to exhaust to the atmosphere.

The approach and results of the SAMWAT-T is very different even though its mass flow is equivalent to the bypass flow of a turbofan. Its cold flow stream is being highly pressurized and pressurized hot water is injected to increase its mass-density and absorb a maximum amount of heat injected by stages of electric heaters. This high volume of compressed air flow, now with a high energy-density enters a high-performance, maximum diameter C-D nozzle at maximum velocity (Mach 1), maximum energy-density and maximum mass density to produce thrust from a supersonic jet-flow exhaust.

The diameter of the C-D nozzle has also been maximized as this will increase the area of the air mass into which it is discharging, and this will increase the net thrust produced. Also, the exhaust from power section will have a low velocity as much energy has been extracted from it as electrical power. Mixing the high and low energy exhausts together will also increase the net thrust produced.

Before mixing the exhausts, the supersonic thrust passes through a multistage high-speed turbine-rotor that direct-drives a high-speed compressor in the last stage of the compressor section. As this level of compression is only required at take-off and climbing most of the mechanical energy produced by the high-speed turbine is directed towards a redundant generator (206).

At takeoff, both the rechargeable battery and the generator are injecting all their available energy output into producing thrust. The power produced by the electrical generator is proportional to the velocity of the aircraft to the power of 3. Air-driven generators, taking off at a 25% higher ground speed (81.3 versus 65.0 m/s), will produce 1.95 times more electricity. Runway takeoff speed and the performance of the SAMWAT E/G generator at this speed are key considerations.

New aircraft designed to operate without fuel will require less lift, will produce less drag at takeoff and will take off at higher ground speeds. The main technical challenge remains reaching break-even thrust at takeoff speed as this is the point when the aircraft must be self-sufficient in energy and thrust. How can aircraft accelerate faster, to higher ground speeds on the runway, to reach self-sufficiency?

An auxiliary vehicle equipped with one or multiple jet engines connects to the back of the airplane at either the landing gear or other appropriate location. The remote-controlled vehicle, named a 'runway-pusher', is controlled by the pilot and these jet-engines rapidly push the airplane up to takeoff speed and beyond. As these pushers are ground based, their weight and fuel load are not a consideration. By coupling multiple units together, they can provide an unlimited amount of acceleration and quickly reach high ground speeds.

The pusher breaks away on command from the pilot and the airplane takes off with its SAMWAT-Thrusters providing the required thrust. Other systems such as rockets could be attached to the plane to achieve take-off speed, but from a safety and cost viewpoint the runway pusher is the most practical.

Battery operated vehicles could be used in warm climates where traction between the wheels of the pusher and the runway are not a problem. But for wet, icy and snow-covered runways the jet-engine is the safest solution. Plane, maintenance and ground crews are already fully trained to support and operate jet-engine technology.

A runway-pusher (201) can provide more thrust than a standard aircraft as it is only used on the ground for minutes per take-off. The airplane will accelerate faster and take off at higher velocities that allow the plane to carry a heavier load without fuel. These runway-pushers can be designed to make less noise making airports and surrounding areas quieter.

The 'runway pusher' is an integral part of this innovative system for commercial flight that avoids employing combustion or oxidation type fuels on airplanes. There will be no more fires on airplanes, not on the ground, not in the air and not in the event of a crash. If society wants to go for ZERO emissions, the runway-pushers can be powered by 'multiple' SAMWAT-Thruster units.

The operating speeds for a typical commercial airliner vary from 65 m/s at take-off to Mach 0.95 or 325 m/s and this corresponds to a ratio of 5:1. At take-off, the density of the atmosphere and the drag it produces are high, while at 325 m/s the air density and its drag are low. As it is thrust that accelerates the plane against drag, we need the diffuser discharge velocity and density to be highest at 65 m/s. To obtain a constant, maximum discharge velocity at 325 m/s and at 65 m/s, the cross-sectional area of the diffuser discharge will be diminished by 5:1.

This change in cross-sectional discharge area is achieved using a partitioning control mechanism. The mechanism is installed in the ducted channel between the discharge from the axial flow compression zone and the first stage of electrical heaters. The circular, annular ducted channel has been partitioned into multiple equal, independent flow channels that begin at the discharge from the compressors and extends to the C-D diffuser discharge. FIG. 13 illustrates the functioning of the partition control mechanism.

Within the partitioning controller, each partitioned flow channel is equipped with an actuator (238) that can insert or retract a flow control element (239) that adjusts the flow volume by diverting the flows of the channels. The configuration of the flow control elements dictates the flow control action. An orifice will decrease the flow, a solid face will shut off the flow and an inclined solid face will divert the flow into an adjacent channel. If more than two flow options are required, two sets of control mechanism are installed in series and the appropriate control element is selected for the desired effect.

In this instance, at lower mass flow rates in each channel the desired effect is to progressively divert the flow from four adjacent channels into a fifth channel to increase the flow velocity. As wall friction will decrease the total mass flow of the five channels the compressors will back up on their flow curves and this will provide additional pressure in all channels.

In order to maintain a flow rate though one channel equivalent to five channels, the speed of rotation of the compressor blades (209) is maximized. The result is that the discharge velocity at the diffuser exhaust has been held constant even though the number of flow channels (discharge area) has decreased. In terms of thrust, 325 units of mass discharging at 1 m/s in five channels is equivalent to 65 units of mass discharging at 5 m/s in one channel.

By employing more mechanical energy per unit of mass flow, it is possible to obtain the same thrust at low air speeds as at high air speeds. This is critical at takeoff when airplane speed and mass flow are low, and the required thrust is highest. Jet-engines have no limit on the amount of fuel they can burn, their solution to produce more thrust at lower speeds is to burn more fuel.

Efficient mechanical compression is required to obtain the maximum energy-density before the C-D nozzle. As variable-speed drives are more efficient than fixed-speed drives the thruster compression section is equipped with at least four variable speed compression units of 3-rotors per unit. As shown in FIG. 14A, the inlet air is also assisted by an inlet propulsor. The compressor section is in the shape of a convergent that serves to funnel the compressed air outwards to the periphery and into a ducted channel of maximum radius at the outlet of the convergent section.

The last stage of inlet air compression is important as the final static pressure developed by the last stage represents the counter pressure that is available to prevent backflow from the high pressures created by the heat injected at the electrical heaters. The static pressure at the outlet of the last stage determines the maximum input operating pressure of the C-D nozzle and requires a compressor rotor turning at high-speed. Given the high-speed required, rather than use electrical power, it is preferable to use direct mechanical power from a turbine-rotor that is rotating at a similar high-speed.

For this reason, a two stage turbine-rotor assembly is installed at the discharge of the C-D nozzle and it will have three functions: 1. provide direct mechanical power to the last stage of compressors at high-speeds of rotation, 2. serve as part of noise abatement as the noise from the C-D nozzle will be high and the rotor, blades and housing will block and deflect part of the noise produced, and 3. when the high-speed stage of the compressors is not necessary, its rotating shaft will drive a reducer-generator assembly that will supply a redundant source of electrical power to the rechargeable battery. This assures the SAMWAT battery is always fully charged at landing and will help to minimize the size and the weight of the battery.

Large rechargeable batteries have a problem of catching fire. In the SAMWAT, the batteries are circular and are installed as isolated modules (243) around the circumference of the outside wall of the power section. If a fire were to develop in one-module the remaining modules remain operational, and as the battery is located outside of the power section there will be no damage to the power or thruster sections and no fumes will enter the cabin.

A typical SAMWAT thruster for international flights would have an outside radius for the power section of 55 inches/22 cm and an outside radius of the compressor rotors would be 48 inches/19 cm. This includes the space required for installing an aerodynamic cowling (227) around the outer perimeter of the power and thruster sections. This diameter is important as to build up static pressure, high compressor blade-tip speeds and progressively higher rpm are required. As it is compressed, the temperature of the air will rise by the action of the molecules being forced closer together. This mechanical compression will heat the air stream but not enough to obtain the required C-D nozzle discharge velocities without heat injection. FIG. 14 illustrates the overall functionality of a SAMWAT-T.

To further increase the thrust, pressurized hot water (liquid steam) is injected into the compressed flow stream. Assuming an injection of pounds of water per pound of air, the density of the mixture will increase due to the increased pressure given that as more heat is applied the pressure increases (Universal Gas Law).

Accordingly, immediately following the injection of pressurized hot water, just before entering the C-D nozzle, the air stream passes through stages of electrical heaters. The temperature rise from the heaters produces an immediate rise in pressure as per the universal gas laws and this pressure rise converts to a higher discharge velocity as per Bernoulli.

There are no moving parts in the thruster between the partition control mechanism and the diffuser discharge. There are no expected corrosion problems resulting from the injection of hot water into a stream of hot compressed air, travelling in a smooth ducted channel feeding a C-D nozzle, wherein all materials are quality stainless steel.

The energy of the power air stream is depleted by the extraction of electricity, and this low velocity stream is mixed with the high velocity thruster discharge flow stream. The two exhaust streams are directed towards each other at a slight angle so that they intersect within the exhaust section. The result of the mixing of slower and faster streams is that more net thrust is produced as the slower air acts as a better resistance to the push forces of the thrust stream.

Jet-engine maintenance is a significant cost. The temperature reached after the combustion chamber are in the 1,600-2,000 degrees Fahrenheit. The stresses and wear on the components in the hot section are high. The maximum temperature in a SAMWAT-T will be immediately after the electrical heaters and are in the range of 450-600 degrees Fahrenheit.

As the plane accelerates, more and more thrust become available even though less thrust is required at higher altitudes as the drag is decreasing. Maintaining transonic speeds without fuel are a possibility as the normal condition in the convergent and the throat of the C-D nozzle will be 'Mach 1 and choked flow'. In the nozzle discharge the velocity exceeds Mach 1. The discharge velocity for producing thrust is a function of the energy-density of the flow stream directly upstream of the C-D nozzle.

In the SAMWAT-Thruster the discharges from the C-D nozzle are maximized at above Mach 1 and the energy-density required before the C-D nozzle is obtained by: 1. compressed air obtained by multiple stages of motorized, variable speed, mechanical compression of the cold thruster inlet flow stream, 2. the use of a high-speed rotor in the last stages of compression (208), 3. adjustment of the discharge area of the C-D nozzle to maintain maximized velocity at low mass flow rates, 4. high pressure hot water injection followed by multiple stages of electrical heating to maximize the mass flow density, the temperature and the pressure of the mixture.

Other features of airplane operation that may be handled differently include reverse thrust on landing and bird strike protection. The easiest way to reverse the thrust with a SAMWAT thruster is simply to counter-rotate simultaneously the engines by 180 degrees (207). A motorized turret installed under the wing will rotate the direction of thrust in seconds. In the case of bird strikes, an umbrella shaped course netting deploys (221 & 222) to cover the SAMWAT-T inlet if radar detects any object in front of the thruster or the wings. This is retracted as soon as all threats disappears from radar. It can be deployed on the runway for personnel protection.

The SAMWAT E/Generator and SAMWAT-Thruster are unique and innovative, whose superior performance is supported by their designs to produce maximum work done through their maximum production of MFWD, MDWD, MVWD and MDWD and by their more efficient process unit-operations.

As a person of skill in the art will understand, the integration of the power section and the thruster section into one assembly is not the only arrangement for a thruster that is driven by power generated in flight from the energy of the incoming air stream. The power section can be installed by itself in a second separate assembly as the connection between the power and thruster assemblies is simply power and control cables. Neither the power nor the thruster assemblies need to be installed under the wings and can be installed anywhere around the aircraft judged appropriate for airplane operations.

Installing only the thruster section in one assembly will allow the thruster section to be more powerful. A separate power assembly, without a thruster can contain not only a bigger powered unit, but also several independent power units that can be installed in a common power assembly. There are independent inlets and exhausts installed on the faces of the cylinders that make up each of the power units. Each power unit is contained in its own cylinder, the cylinders fit one inside the other to form concentric circles and the cylinders are attached together to form a common assembly.

As a person of skill in the art will understand, the input propulsor fan to the power section and the thruster section may be one common unit or two independent units. The thruster and power sections depicted use independent propulsor units as their independent variable speed drives produces better control of the velocities and better efficiency that reduces their electrical power consumption Further, it is understood that the ducted walls of the convergent play an important role increasing the energy-density of the the inlet stream and that, if necessary, adding a larger or a double convergent can further improve performance. A 'Berger' optimized convergent solution with its horizontal inclined upper and lower walls is an example of a convergent that if required will improve the compression versus the present convergent section. The Berger convergent will cover the entire face of the power and thruster sections.

In addition, the SAMWAT Thruster is designed to produce maximum thrust by incorporating several processes to maximize the energy-density of the flow stream at the throat of the C-D nozzle. In some applications, it will not be necessary to produce maximum energy-density of the flow stream but only enough energy-density to achieve self-sustaining flight at takeoff. Also, with time the performance of one or several processes may improve such that fewer processes are required to obtain enough energy-density.

The processes involved in the thruster section to maximize the energy-density of the flow stream by their cumulative effects are listed in table 2 below.

As a person of skill in the art will understand, the different possible applications involving size and weight of the aircraft, the flight conditions in term of atmospheric conditions and the evolution of the efficiencies of each of the above-listed processes will result in SAMWAT-Thrusters that use at least Item 1) of Table 1. But, not all of the other above processes are required in each application to obtain an energy-density high enough to support self-sufficient flight.

As shown in FIG. 14A, the SAMWAT-Thruster assembly (200) includes a power section (234) including a segmented annular ducted channel receiving a first air flow stream and expelling the first air flow stream in a first exhaust stream (224), the segmented annular ducted channel including a convergent section (215) configured to accelerate the first air flow stream received at a power inlet, a segmented turbine-rotor section (216) including a turbine rotor (236) and plurality of blades and optional guide vanes (209) rotating around the outside wall (203) of the thruster section (235) and is supported by a bearing assembly (210) that is mounted on said outside wall (203), said rotation transferred to a plurality of generators (204, 205) for generating electricity fed to a battery (230), and a diffuser section (217) configured to decelerate the first air flow stream before the fluid exits at a power outlet. The SAMWAT-Thruster assembly (200) further includes a thruster section (235) receiving a second air flow stream through a thruster convergent section and expelling the second air flow stream in a second exhaust stream (223) at a thruster divergent section, the thruster section (235) including an inlet propulsor (241) leading to a large diameter ducted channel and a partitioned narrow-ducted annular channel (218), the thruster convergent section including a plurality of compression stages (208) and a high-speed compressor stage (213) for compressing the second air flow stream, a high-speed turbine rotor assembly (211), a converging-diverging nozzle assembly (229), a plurality of heaters (226) for heating the second air flow stream, and a dosage pump (232) for injecting pressurized hot water from a pressurized hot water storage tank (237) into the second air flow stream. The throat of the converging-diverging nozzle assembly (229) is configured to choke the flow of the second air flow stream before it expands in the thruster divergent section, and the first exhaust stream (224) and the second exhaust stream (223)

TABLE 2

Processes increasing the flow stream energy-density

1) The use of a main battery to inject supplemental additional energy into the motorized devices operating on the thruster flow stream to increase its level of energy-density.
2) The use of a convergent section with powered inlet propulsor(s) (240) and a diffuser section with powered outlet propulsor(s) (241) to produce augmentation effects on the thruster flow stream to increase its level of energy-density.
3) The use of a runway-pusher or equivalent device to accelerate the plane to enough air speed to obtain a level of energy-density in the thruster flow stream to support self-sufficient flight at takeoff.
4) The use of powered/motorized axial & radial compressors injecting heat and momentum into the thruster flow stream to increase its level of energy-density.
5) The use of high-speed compressor stages (213) driven by a high-speed turbine-rotor assembly to inject heat and momentum into the thruster flow stream to increase its level of energy-density.
6) The injection of heat into the thruster flow stream by electrical heaters to increase its level of energy-density.
7) The injection of hot pressurized water into the thruster flow stream to increase its level of energy-density.
8) Passing the thruster flow stream through a C-D nozzle to increase its level of energy-density.
9) The use of a partitioned ducted channel that allows the total energy applied to be concentrated within a flow stream of decreased volume to increase its level of energy-density.

are mixed at an exhaust mixing section (225) that is essentially the atmosphere as they are discharged to provide thrust to the aircraft.

SAMWAT with Independent Channels

Legacy, ducted fluid turbines and the SAMWAT are based on a central inlet that feeds a common continuous flow channel that discharges through a common, continuous outlet. In the case of the SAMWAT, in order to segment the flow stream, inserts are attached to the wetted face of the rotor to divide the continuous flow channel into segmented channels that are either sealed or flow-through and this serves to reduce the percentage of bladed-area.

A problem occurs at high segmented ratios of the order of 2-3% bladed-area (flow-through) and 97-98% sealed area, whereby 97-98% of the rotor, stator and inserts are not contributing to any productive work. Also, the leakage between the faces of the rotating inserts and the stator becomes larger versus the fluid flow over the blades.

These problems have led to an embodiment of SAMWAT called the independent channel. In terms of the SAMWAT design, the independent channel is considered as a type of segmented flow channel as the main operational functionality is the same; essentially, increase the radius of the blades while maintaining a constant flow rate. However, the flow channel is no longer annular, simply single-walled and ducted. The acronym for this technology becomes: Segmented, Augmented, Maximum Work, Independent Channel Turbine or SAMWICT (101).

Referring now to FIG. 15, the independent channel (101) is unique in that rather than dividing a large continuous channel by applying inserts, the independent flow channels (56) are designed with a plurality, for example four, sidewalls that are continuous and sealed and the power extraction blades and guide-vanes used in the turbine-rotor (32) and diffuser sections (21) are attached to one or multiple inner faces of the walls of the channel.

As a person of skill in the art would understand, the configuration of the cross-section of the independent channel could be round, triangular, square, rectangular, star shaped or other. This will depend on each application and the type and size of the blades selected. The independent flow channels (56) and braces (58) may be covered by an aerodynamic outer shell to reduce drag as they rotate.

The four sidewalls of the channel replace the standard enclosure provided by the walls of the stator and rotor. As the flow stream passes through the independent channels, the lift produced by the blades will rotate the assembly in the same manner and under the flow conditions as described in the segmented rotor.

Each independent, four-sided, channel assembly has its own independent inlet transfer line (59), convergent section (30), turbine-rotor section (32), diffuser section (31) and discharge transfer line (57). At each end of the SAMWICT assembly, there is a centrally located rotary joint (52, 53) with one or multiple ports that either distributes its inlet flow via rotating transfer lines (59) to each channel inlet or collects the flow from each channel discharge via rotating transfer lines (57) and returns its outlet flow to the propulsor suction. An inlet surge tank and outlet surge tank may precede the inputs and outputs of the two rotary joints.

As a person of skill in the art would understand, the rotary joints can directly feed the transfer lines (57, 59) or can connect to the ends of the rotating shaft (12). A flow channel cut into the ends of the rotating shaft discharges at points around its circumference that serve to feed or collect discharge from the transfer lines. The transfer lines (57, 59) may be integrated into the body of the endplates wherein the endplates are feeding and discharging channel flow (60) and the flow channel in the rotating shaft is feeding the integrated transfer lines within the endplates.

Given the high velocities incurred at the inlet to the diffuser section and the high probability of jet flow conditions, correctives measures are foreseen and are representative but not limited to the following activities. One or multiple stages of blades and guide-vanes (21) may be installed along the length of the diffuser section as will surface effects known to create the Cuanda effect. Another possible solution will be the injection of high velocity fluid along the inner face of the outer wall as well as the installation of one or a plurality of rotating, rectifier elements (69).

The ends of the independent flow channels are mounted around the circumference of rotating endplates (54, 55) and their rotating shaft (12) can drive an electrical generator (40) or propulsor (70) or related power applications. The end plates are held in place by solid braces (58) located around their periphery and/or by a central continuous rotating shaft. A typical end plate resembles a wheel with spokes or a solid disc with radial reinforcing bars, or, in the case of only two channels, it may take the form of a figure-eight.

The rotating joints serve to distribute the fluid flow from its stationary, laterally fed input connection to an output feeding multiple rotating transfer pipes and to collect the discharge from multiple rotating pipes connected to the diffuser section and feed its output to the suction of the propulsor.

The braces also serve to support the independent channels and to transmit torque generated by the blades to the endplates. The rotating shafts may serve to support and drive annular-type generators (61) or to drive standard, one or two bearing generators (40). Generators feed a modular rechargeable battery (43) that serves to start the operation of the turbine assembly and feeds power to local or main electrical grids.

As someone experienced in turbine operations would understand, the number of independent channels per turbine will vary according to power demand. For personal safety a stationary enclosure (not illustrated) will surround the unit and this enclosure may serve to support the modular, rechargeable battery and to help control the heat or cold generated or required by the operating system.

The independent channels may be straight, spiral or a combination that includes offsets. Like the case for the application of the faces of the walls of inserts, the contour of the faces of the inner side walls of the independent channels vary to adjust the velocity and direction of the flow stream along its length and most particularly over the blades and guide-vanes in the turbine-rotor section.

This embodiment employs independent channels operates in recycle mode using a propulsor (70) for recirculation of the fluid flow stream (60), using an independent compressor to increase and maintain the working pressure (72), and using a chiller or heat pump (71) to add external or remove internally generated heat as required. As a person of skill in the art would understand, the propulsor (70), the compressor (72) and the chiller or heat pump (71) could be directly driven by the rotating shaft. Further, the propulsor could be single-staged or multi-staged, rotary or piston-type, and with multiple units operating in series or parallel.

Part of the recirculation piping (62) or the independent channels are covered by a finned heat transfer material. In order to minimize the thickness of the walls of the independent channels, circular reinforcing clamps will be applied against the exterior walls at an appropriate interval along their length. The preferred fluid (72) for operations involving the use of independent channels are water, water solutions or non-ionic solutions.

The scope of the claims should not be limited by the preferred embodiments set forth in the examples but should be given the broadest interpretation consistent with the description as a whole.

The invention claimed is:

1. A segmented augmented turbine assembly (100) for generating electricity from a fluid in motion, the segmented augmented turbine assembly (100) comprising:
   a segmented annular ducted channel (7) extending between an inlet for receiving a flow stream (11) of the fluid and an outlet for expelling the fluid, said segmented annular ducted channel comprising a convergent section (30) configured to accelerate said fluid received at said inlet, a segmented turbine-rotor section (32) comprising a plurality of blades (1) rotating about a central shaft (12) operatively coupled to a generator (40) for generating electricity, and a diffuser section (31) configured to decelerate the fluid before the fluid exits at said outlet;
   wherein said segmented augmented turbine assembly (100) further comprises a recycling unit comprising a propulsor (70) for propulsing said flow stream (11) from said outlet to said inlet via a plurality of piping (69.1);
   wherein said segmented annular ducted channel (7) comprises a plurality of solid inserts (8) attached to an outside face (5,6) of said segmented turbine-rotor section (32), said flow stream (11) passing through a plurality of open flow-through segments (3) positioned between said solid inserts (8); and
   wherein said plurality of solid inserts (8) divides said channel (7) into a plurality of sealed segments (2) and a plurality of open flow-through segments (3).

2. The segmented augmented turbine assembly (100) of claim 1, wherein said segmented annular ducted channel (7) further comprises a first transfer channel section (33) between said convergent section (30) and said segmented turbine-rotor section (32) and a second transfer channel section (34) between said segmented turbine-rotor section (32) and said diffuser section (31), said first transfer channel section (33) and said second transfer channel section (34) configured such that a centerline radius of said turbine-rotor section (32) is equal to or greater than each of the centerline radius of said convergent section (32) and the centerline radius of said diffuser section (31).

3. The segmented augmented turbine assembly (100) of claim 2, wherein said plurality of solid inserts (8) extends at least partially along the length of at least one of said turbine rotor section (32), said convergent section (30), said first transfer channel section (33), said segmented turbine rotor section (32), said second transfer channel section (34), or said diffuser section (31).

4. The segmented augmented turbine assembly (100) of claim 1, wherein said outside face (5, 6) of said segmented turbine-rotor section (32) comprises an additional plurality of said inserts.

5. The segmented augmented turbine assembly (100) of claim 1, wherein said plurality of solid inserts (8) each comprise non-linearly shaped outer walls.

6. The segmented augmented turbine assembly (100) of claim 1, wherein said flow stream (11) is discharged from said outlet to the atmosphere.

7. The segmented augmented turbine assembly (100) of claim 1, wherein said segmented turbine-rotor section (32) further comprises a plurality of guide vanes (10) to guide the flow stream (11) over said blades (1).

8. The segmented augmented turbine assembly (100) of claim 1, further comprising a chiller (71) for removing heat from said flow stream (11).

9. The segmented augmented turbine assembly (100) of claim 1, further comprising a compressor (72) for pressurizing said flow stream (11).

10. The segmented augmented turbine assembly (100) of claim 1, further comprising a plurality of steps (97.3) integrated into walls of said segmented flow channel (7) to promote the Cuanda effect.

11. The segmented augmented turbine assembly (100) of claim 1, wherein ends of each of said plurality of blades (1) are connected by a circular ring (15) or cylinder.

12. The segmented augmented turbine assembly (100) of claim 1, wherein said flow stream (11) comprises at least one of air, compressed air or water.

13. The segmented augmented turbine assembly (100) of claim 1, where in use, the rotational velocity of said flow stream (11), said blades (1) and said guide vanes (10) are equal.

14. The segmented augmented turbine assembly (100) of claim 1, wherein said diffuser section (31) further comprises at least one stage of turbine-rotors (31.1-31.5) for extracting energy from the fluid as it passes through said diffuser section (31).

15. The segmented augmented turbine assembly (100) of claim 14, wherein said at least one stage of diffuser section turbine-rotors (31.1-31.5) are connected to said central shaft (12) by a plurality of support arms (17).

16. A system for providing thrust to an aircraft, the system comprising:
   a power section (234) comprising a annular ducted channel receiving a first air flow stream and expelling said first air flow stream in a first exhaust stream (224), said annular ducted channel comprising a convergent section (215) configured to accelerate said first air flow stream received at a power inlet, a turbine-rotor section (216) comprising a turbine rotor (236) and a plurality of blades (209), and a diffuser section (217) configured to decelerate said first air flow stream before the fluid exits at a power outlet; and
   a thruster section (235) receiving a second air flow stream through a thruster convergent section and expelling said second air flow stream in a second exhaust stream (223) at a thruster divergent section, said thruster section (235) comprising an inlet propulsor (241) leading to a large diameter ducted channel, said thruster convergent section comprising a plurality of compression stages (208), and a diverging nozzle assembly (229);
   wherein said first exhaust stream (224) and said second exhaust stream (223) are mixed as they are discharged to provide thrust to the aircraft, and
   wherein said annular ducted channel (7) is segmented and comprises a plurality of solid inserts (8) attached to an outside face (5, 6) of said turbine-rotor section (32), said flow stream (11) passing through a plurality of open flow-through segments (3) positioned between said plurality of inserts (8), and wherein said plurality of solid inserts (8) divides said channel (7) into a plurality of sealed segments (2) and said plurality of open flow-through segments (3); or
   wherein said plurality of blades are configured to rotate around an outside wall (203) of said thruster section (235) and are supported by a bearing assembly (210)

mounted on said outside wall (203), said rotation transferred to a plurality of generators (204, 205) for generating electricity fed to a battery (230).

17. The system of claim 16, wherein the system is configured to power an aircraft operating in at least one of subsonic speeds, transonic speeds, or supersonic speeds.

18. A segmented augmented independent channel turbine assembly (101) for generating electricity from a fluid stream in motion (60), the segmented augmented independent channel turbine assembly (101) comprising:
- at least one independent flow channel (56) comprising a plurality of sidewalls extending between an inlet for receiving the fluid stream (60) and an outlet for expelling the fluid stream (60), said at least one independent flow channel (56) comprising:
  - a convergent section (30) being fed the fluid stream (60) by an inlet transfer line (59), said convergent section (30) configured to accelerate the fluid stream (60);
  - a turbine-rotor section (32) comprising a plurality of stages of blades (32.1-32.3) attached to said sidewalls of said at least one independent flow channel (56), said blades (32.1-32.3) rotatable about a central shaft (12) operably coupled to a generator (61) for generating electricity, the fluid stream (60) rotating said blades (32.1-32.3) as it passes through said turbine-rotor section (32); and
  - a diffuser section (34) expelling the fluid stream (60) through an outlet transfer line (57), said diffuser section (34) configured to decelerate the fluid stream (60) before it exits at said outlet; and
- a propulsor (70) for recirculating the fluid stream (60) through said at least one independent flow channel (56) via recirculation piping (62), said propulsor (70) receiving the fluid stream (60) from said outlet transfer line (57) and propulsing the fluid stream to said inlet transfer line (59),
- wherein said at least one independent flow channel (56) is attached to a plurality of rotating endplates (54, 55) supported by a plurality of bearings (41, 42) and to a plurality of solid braces (58) attached to the faces of said endplates (54, 55) to assist in holding said endplates (54, 55) and said at least one independent channel (56) in alignment and to transfer torque from said blades (31.1, 31.2, 31.3) to said endplates (54, 55).

19. The segmented augmented independent channel turbine assembly (101) of claim 18, wherein said endplates (54, 55) each comprise a circular hollow shape serving as a transfer line to and from the inlet and outlet of said at least one independent flow channel (56).

* * * * *